(12) United States Patent
Van Bommel et al.

(10) Patent No.: US 9,462,650 B2
(45) Date of Patent: Oct. 4, 2016

(54) LIGHT EMITTING DEVICE AND A METHOD FOR DIMMING A LIGHT EMITTING DEVICE

(71) Applicant: KONINKLIJKE PHILIPS N.V., Eindhoven (NL)

(72) Inventors: Ties Van Bommel, Eindhoven (NL); Rifat Ata Mustafa Hikmet, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/904,757

(22) PCT Filed: Jul. 16, 2014

(86) PCT No.: PCT/EP2014/065194
§ 371 (c)(1),
(2) Date: Jan. 13, 2016

(87) PCT Pub. No.: WO2015/007755
PCT Pub. Date: Jan. 22, 2015

(65) Prior Publication Data
US 2016/0157316 A1 Jun. 2, 2016

(30) Foreign Application Priority Data
Jul. 19, 2013 (EP) .................................. 13177145

(51) Int. Cl.
*F21V 8/00* (2006.01)
*H05B 33/08* (2006.01)
(52) U.S. Cl.
CPC ........... *H05B 33/0845* (2013.01); *G02B 6/005* (2013.01)

(58) Field of Classification Search
CPC ...... G02B 6/00; G02B 6/005; G02B 6/0066; G02B 6/0075; G02B 6/0096
USPC .......................... 362/509, 511, 606, 610, 615
See application file for complete search history.

(56) References Cited

U.S. PATENT DOCUMENTS

2011/0175549 A1 7/2011 Yoshida
2011/0286200 A1 11/2011 Iimura
(Continued)

FOREIGN PATENT DOCUMENTS

WO 2007036877 A2 4/2007
WO 2011100710 A1 8/2011

*Primary Examiner* — Jason M Crawford

(57) ABSTRACT

A light emitting device, comprising at least two light sources (21, 22, 23, 24) adapted for, in operation, emitting light with a first spectral distribution, a first light guide (4) comprising a first light input surface (41), which is arranged parallel to the main waveguiding direction of the first light guide (4), and a first light exit surface (42) extending in an angle different from zero in relation to the first light input surface (41), the first light guide being adapted for receiving the light with the first spectral distribution at the first light input surface, converting at least a part of the light with the first spectral distribution to light (14) with a second spectral distribution, guiding the light (14) with the second spectral distribution to the first light exit surface (42) and coupling the light (14) with the second spectral distribution out of the first light exit surface (42), the at least two light sources (21, 22, 23, 24) being arranged at mutually different distances from the first light exit surface (42) of the first light guide (4), and a control device (90) adapted for dimming the light emitting device starting with the light source of the at least two light sources (21, 22, 23, 24) which is arranged at a largest distance from the first light exit surface (42) of the first light guide (4).

15 Claims, 17 Drawing Sheets

(56) References Cited

U.S. PATENT DOCUMENTS

| | | | |
|---|---|---|---|
| 2012/0212931 A1* | 8/2012 | Kinoshita | F21K 9/52 362/84 |
| 2012/0243220 A1 | 9/2012 | Yamamoto | |
| 2012/0250350 A1 | 10/2012 | Kim | |
| 2013/0003346 A1 | 1/2013 | Letoquin | |
| 2013/0051065 A1 | 2/2013 | Shiraishi | |
| 2014/0009901 A1* | 1/2014 | Minami | F21S 8/006 362/2 |
| 2014/0043850 A1* | 2/2014 | Thompson | G02B 6/0035 362/607 |
| 2014/0140091 A1* | 5/2014 | Vasylyev | G02B 6/001 362/606 |

* cited by examiner

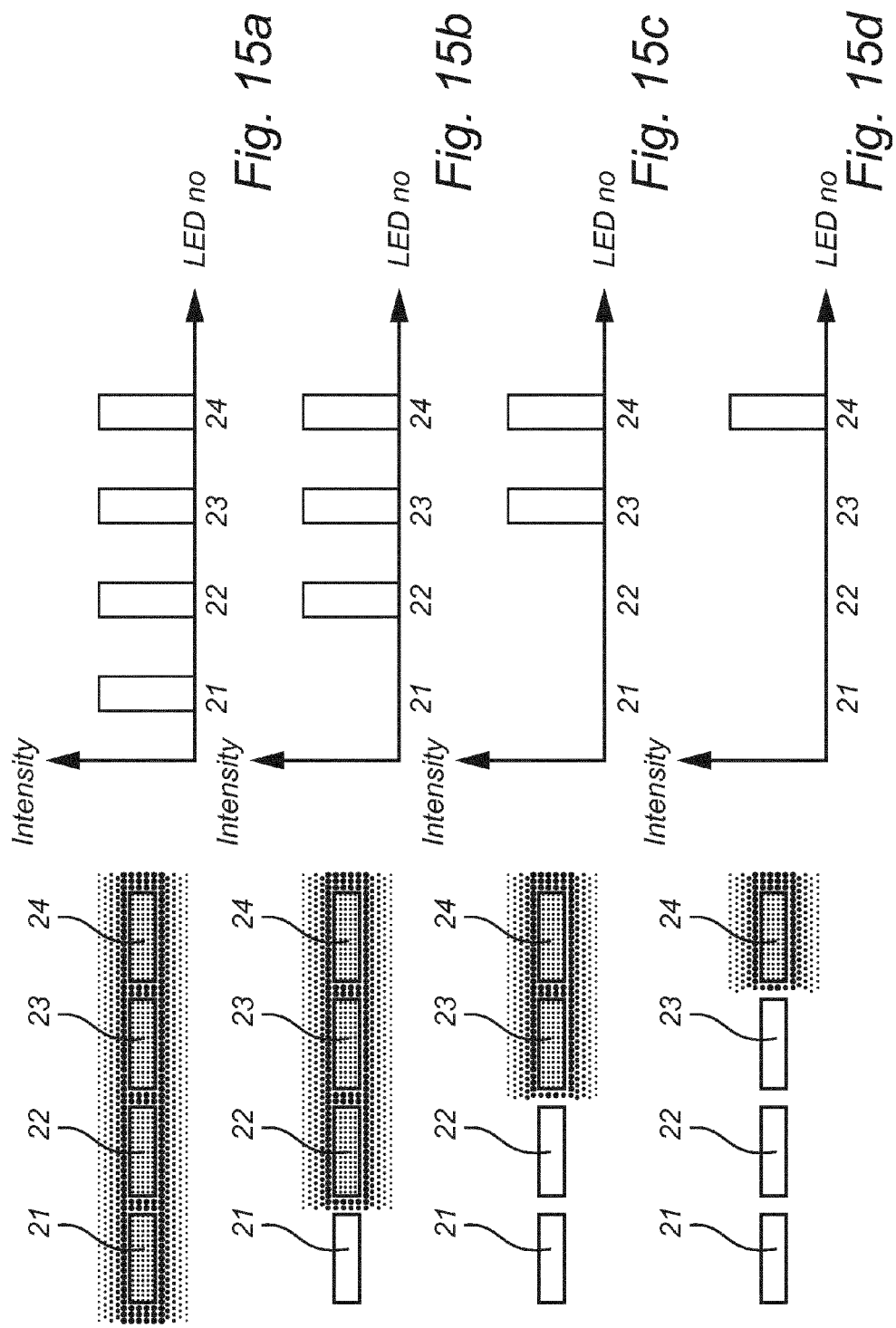

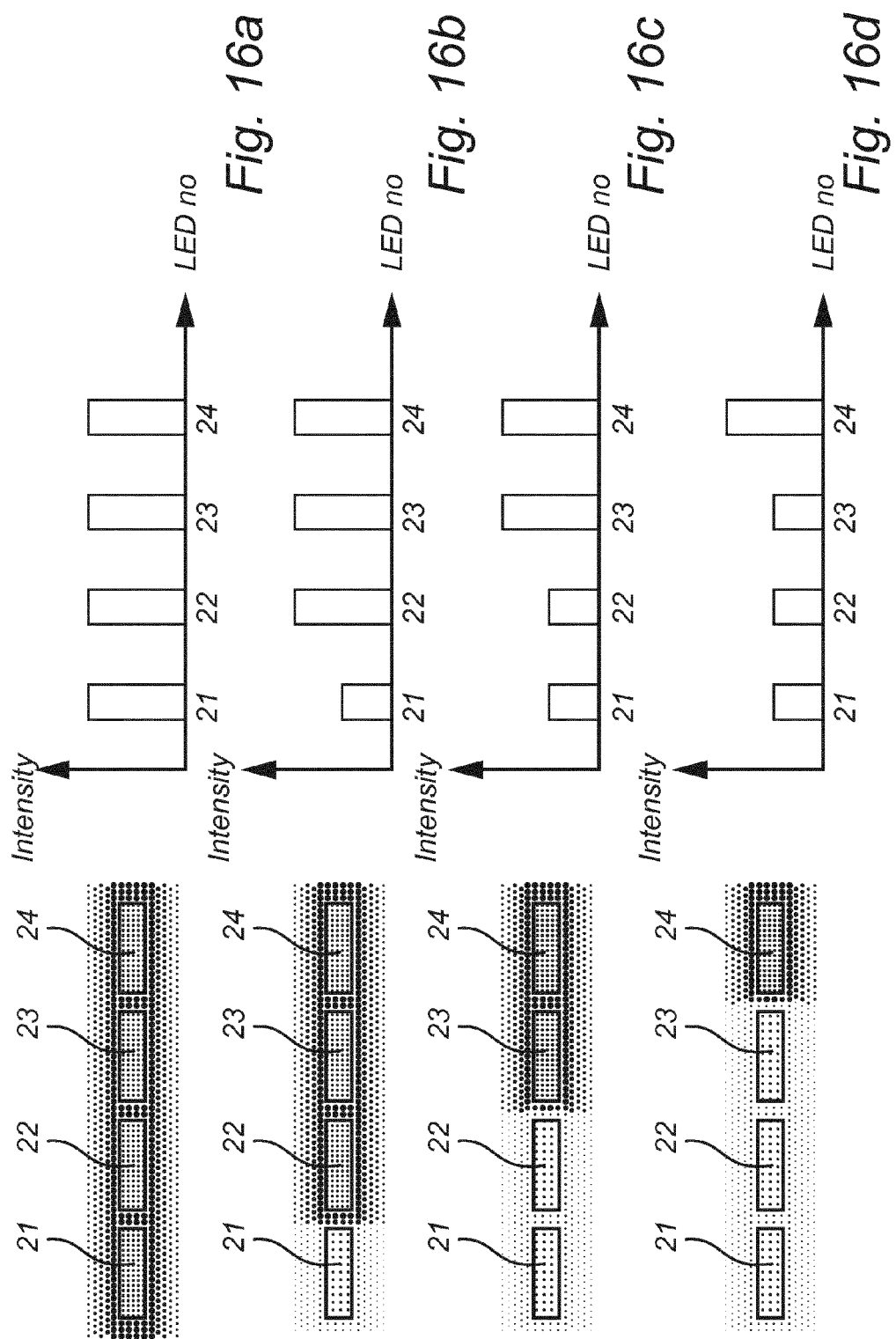

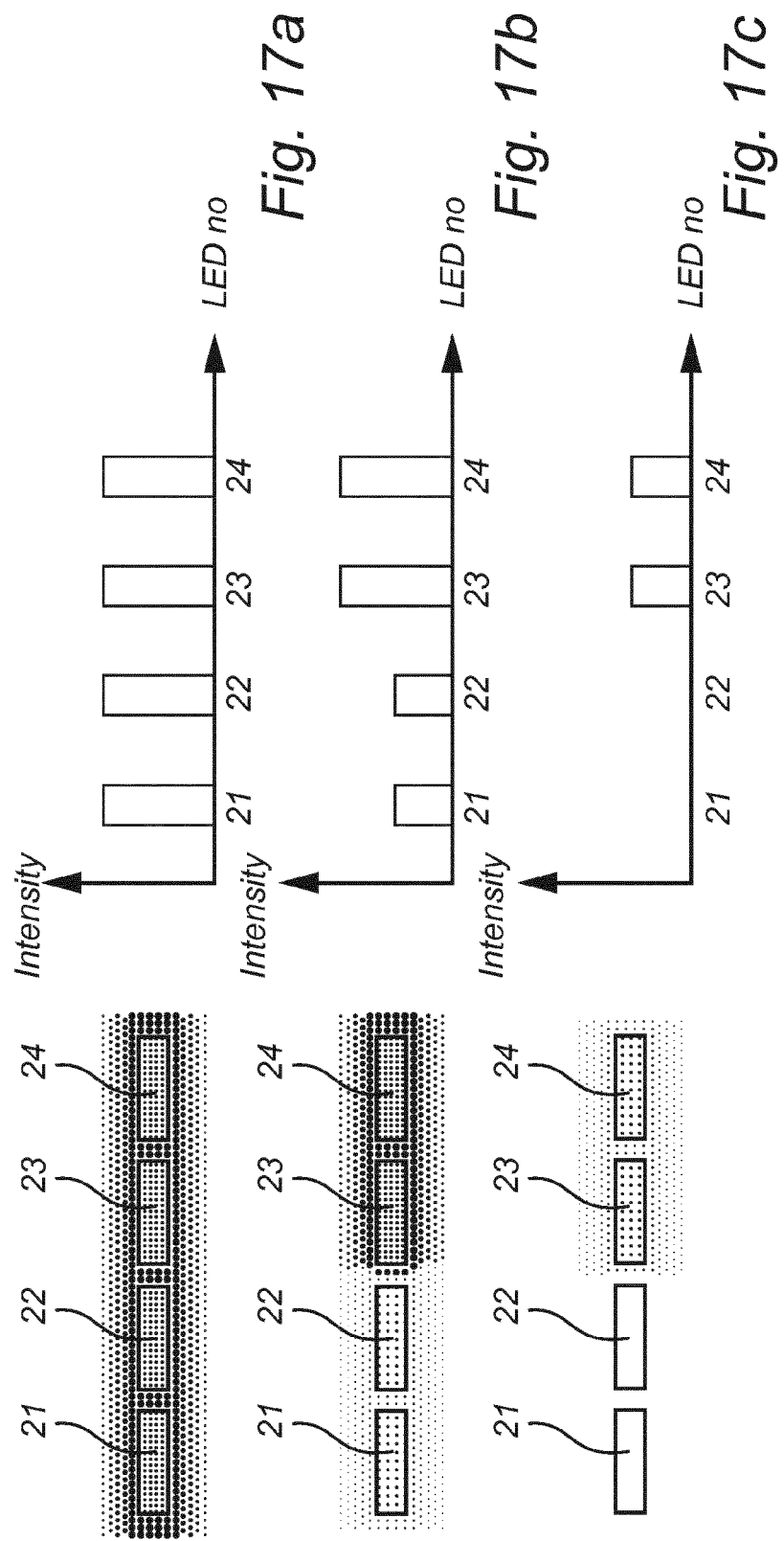

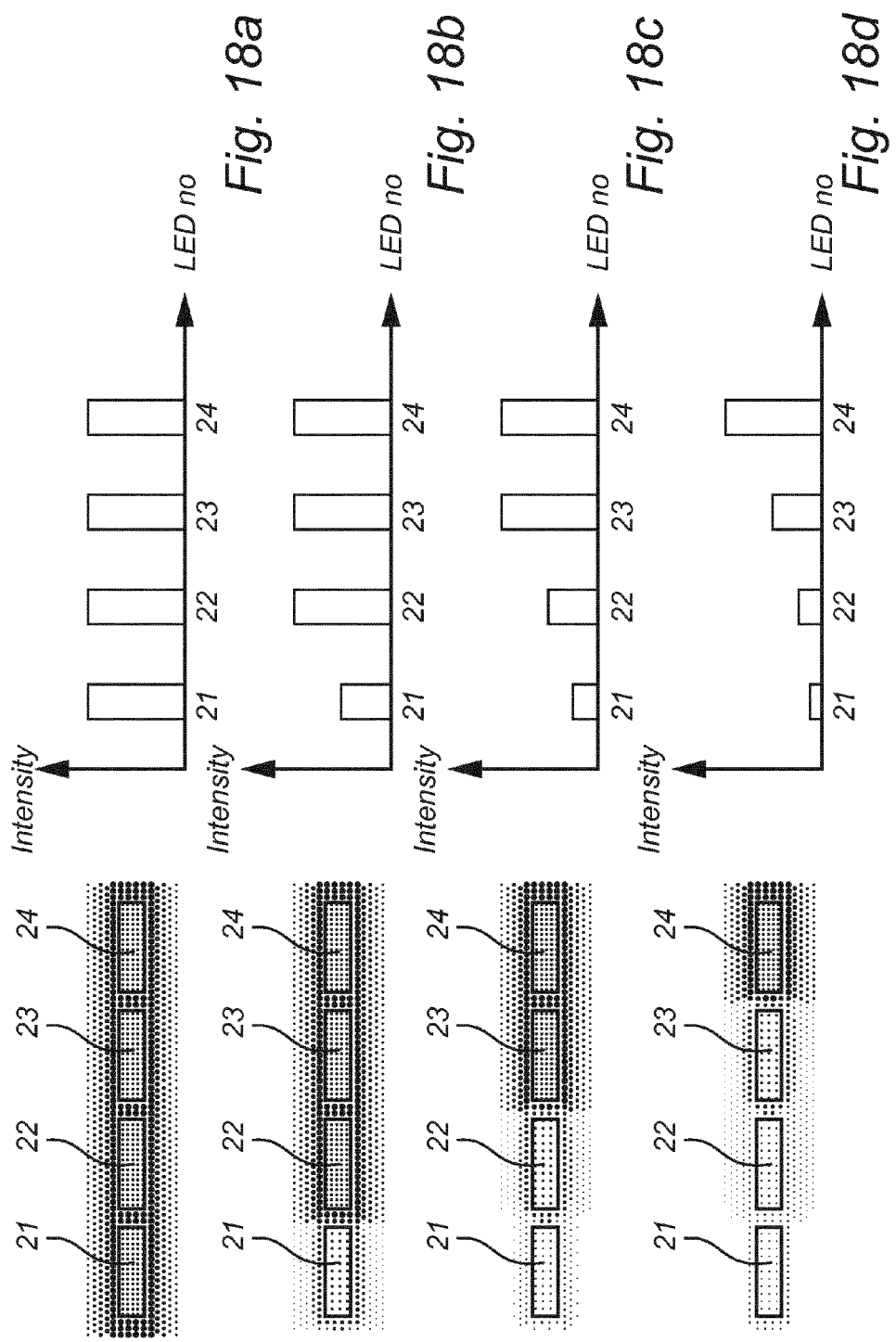

LIGHT EMITTING DEVICE AND A METHOD FOR DIMMING A LIGHT EMITTING DEVICE

CROSS-REFERENCE TO PRIOR APPLICATIONS

This application is the U.S. National Phase application under 35 U.S.C. §371 of International Application No. PCT/EP2014/065194, filed on Jul. 16, 2014, which claims the benefit of European Patent Application No. 13177145.3, filed on Jul. 19, 2013. These applications are hereby incorporated by reference herein.

FIELD OF THE INVENTION

The invention concerns a method for dimming a light emitting device. The invention further concerns a light emitting device adapted for performing a method according to the invention.

BACKGROUND OF THE INVENTION

High intensity light sources, and particularly white high intensity light sources, are interesting for various applications including spots, headlamps, stage-lighting and digital light projection. For such purposes, it is possible to make use of so-called light concentrators where shorter wavelength light is converted to longer wavelengths in a highly transparent luminescent material. Such a transparent luminescent material can be used and is illuminated by LEDs (Light Emitting Diodes) to produce longer wavelengths within the luminescent material. Converted light, which will be waveguided in the luminescent material, is extracted from a surface leading to an intensity gain.

In digital projection it is desirable to dim the screen brightness, for example for saving energy and preserving lifetime of the light source. In the solution described above, a bar of the luminescent material is placed on top of a row of LEDs. Due to losses such as light leakage as a result of scattering and re-absorption as the LED (pump source) is further away from the exit surface its contribution to the total light output becomes less.

Consequently, the dimming is inefficient and inadequate for many practical purposes, particularly within digital projection but also in the area of e.g. spot lights, headlamps and stage-lighting.

US 2012/0243220 A1 describes a light emitting apparatus comprising a plurality of light emission groups each comprising a plurality of LEDs. Each light emission group is associated with a transparent encapsulation and a wavelength converting member. The light emitting apparatus further comprises drivers for collectively controlling the switching on and off and the dimming operations of the LEDs belonging to each light emission group.

In the above prior art solution, however, only relatively few degrees of freedom of dimming, i.e. levels of intensity of emitted light below maximum, are available and the different degrees of dimming are separated by an inconveniently large difference in light intensity.

US2012/0212931A1 discloses a light emitting device includes a first light source, an optical waveguide body, a light emitting layer and a first reflection layer. The optical waveguide body includes a first end surface to which light from the first light source is injected, and a second end surface opposed to the first end surface and provided in a light guiding direction of the light. The light emitting layer includes, along the light guiding direction, phosphor particles capable of absorbing the light and emitting wavelength converted light or a light diffusing agent diffusing the light. The first reflection layer is provided on the second end surface and is capable of reflecting part of the light guided in the optical waveguide body. Diffused light from the light emitting layer is emitted to outside of the optical waveguide body. A controller is provided that can lighten light sources in an order such that a light emitting region moves.

US2011/0175549A1 discloses a linear light source, which emits light by causing light to propagate in a linear material in which incoming light can be propagated. A light emitting device is provided on a side of one end of the linear material which emits light so that the light enters the one end of the linear material and a light receiving device is provided on a side of the other end of the linear material, which detects the light which has propagated in the linear material.

SUMMARY OF THE INVENTION

It is an object of the present invention to overcome this problem, and to provide a light emitting device and method for dimming a light emitting device which is considerably more efficient, which is suitable for a wide variety of practical purposes and which provides for an improved saving of energy and an improved preservation of light source life time.

According to a first aspect of the invention, this and other objects are achieved by means of a light emitting device, comprising at least two light sources adapted for, in operation, emitting light with a first spectral distribution, a first light guide comprising a first light input surface, which is arranged parallel to the main waveguiding direction of the first light guide, and a first light exit surface extending in an angle different from zero in relation to the first light input surface, the first light guide being adapted for receiving the light with the first spectral distribution at the first light input surface, converting at least a part of the light with the first spectral distribution to light with a second spectral distribution, guiding the light with the second spectral distribution to the first light exit surface and coupling the light with the second spectral distribution out of the first light exit surface, the at least two light sources being arranged at mutually different distances from the first light exit surface of the first light guide, and a control device adapted for dimming the light emitting device starting with the light source of the at least two light sources which is arranged at a largest distance from the first light exit surface of the first light guide.

Thereby a light emitting device is provided with which a wide variety of degrees of freedom in dimming are made available in that the light sources may be dimmed separately. Thus the method is suitable for use in a wide variety of practical implementations in which various different and precise degrees of dimming are desired. Furthermore, further energy saving is made possible and an increased light source life time is obtained as the method according to the invention is considerably more efficient in use since fewer light sources need to be dimmed at the same time and since the level of intensity of emitted light may be adjusted with a high level of accuracy according to the given circumstances and requirements.

Improved energy saving is achieved by starting dimming the light source that is arranged furthest away from the light exit surface, because the light originating from this light source (and which will at least partly be converted in the light guide) travels the largest distance through the light guide to the first light exit surface and thus will experience the most losses through, for example, absorption. In other words, the most efficient light source will be dimmed the latest and is the light source that is arranged at the closest distance to the first light exit surface, because the light originating from this light source (and which will at least partly be converted in the light guide) has to travel the shortest distance through the light guide to the first light exit surface and thus will experience less absorption losses.

In an embodiment the control device is adapted for dimming the light sources one by one, thereby providing for further degrees of freedom in dimming.

In an embodiment the light emitting device comprises a plurality of light sources, and the control device is further adapted for dimming at least two light sources of the plurality of light sources such as to emit light at different intensity levels, the intensity levels decreasing with increasing distance between each light source and the first light exit surface of the first light guide.

Thereby a light emitting device is provided with which a further variety of degrees of dimming are made available in that the light sources may be dimmed one by one, i.e. separately, to emit light at two or more different intensity levels, e.g. such that a first light source arranged at the largest distance, i.e. the farthest away, from the first light exit surface emits light at half the maximum possible intensity, a second light source arranged at the second largest distance from the first light exit surface emits light at three quarters of the maximum possible intensity and remaining light sources emit light at the maximum possible intensity.

In an embodiment the light emitting device comprises a plurality of light sources, and the control device is further adapted for dimming groups of at least two light sources of the plurality of light sources starting with the group of at least two light sources arranged at the largest distance from the first light exit surface of the first light guide.

Thereby a light emitting device is provided with which a yet further variety of degrees of dimming are made available in that the light sources may be dimmed groupwise, e.g. two by two or four by four.

In an embodiment the control device is adapted for dimming the groups of at least two light sources one by one, whereby further degrees of freedom in dimming are provided for.

In an embodiment the control device is further adapted for switching off groups of at least two light sources of the plurality of light sources one by one and starting with the group of at least two light sources arranged at the largest distance from the first light exit surface of the first light guide. Thereby an even further degree of dimming is made possible.

In an embodiment the first light guide of the light emitting device comprises at least one further light exit surface, and wherein the control device is further adapted for dimming the at least two light sources one by one starting with that of the at least two light sources being arranged closest to a point P on the first light input surface, which point P is located where the distance perpendicular to each of the light exit surfaces is the largest possible, the distance perpendicular to each of the light exit surfaces being given equal weight.

It is noted that more precisely the phrase "that of the at least two light sources being arranged closest to a point P on the first light input surface" as used herein is intended to refer to that of the at least two light sources being arranged with the shortest distance between the center or middle of the light source and the point P.

Furthermore, the phrase "the distance perpendicular to each of the light exit surfaces being given equal weight" as used herein means that it is equally important that the light source which is dimmed first is located farthest away from all light exit surfaces.

Thereby a light emitting device is provided with which a uniform dimming may be provided in the sense that the light emitted from both or all light exit surfaces is dimmed in an equal or substantially equal degree.

In an embodiment the control device is further adapted for any one or more of switching off at least one of the at least two light sources, sequentially applying at least two continuous direct voltage (DC) currents having mutually different magnitudes to at least one of the at least two light source and using pulse width modulation of a current supplied to at least one of the at least two light sources. Thereby a light emitting device is provided with which a wide variety of degrees of dimming are made available in a particularly simple and straight forward manner.

According to a second aspect of the invention, this and other objects are achieved by means of a method for dimming a light emitting device, the method comprising the steps of providing a light emitting device comprising at least two light sources adapted for, in operation, emitting light with a first spectral distribution, a first light guide comprising a first light input surface, which is arranged parallel to the main waveguiding direction of the first light guide, and a first light exit surface extending in an angle different from zero in relation to the first light input surface, the first light guide being adapted for receiving the light with the first spectral distribution at the first light input surface, converting at least a part of the light with the first spectral distribution to light with a second spectral distribution, guiding light with the second spectral distribution to the first light exit surface and coupling the light with the second spectral distribution out of the first light exit surface, the at least two light sources being arranged at mutually different distances from the first light exit surface of the first light guide, and dimming the at least two light sources one by one starting with that of the at least two light sources being arranged at the largest distance from the first light exit surface of the first light guide.

Thereby a method for dimming a light emitting device is provided with which a wide variety of degrees of dimming are made available in that the light sources may be dimmed one by one, i.e. separately. Thus the method is suitable for use in a wide variety of practical implementations in which various different and precise degrees of dimming are desired. Furthermore, further energy saving is made possible and an increased light source life time is obtained as the method according to the invention is considerably more efficient in use since fewer light sources need to be dimmed at the same time and since the level of intensity of emitted light may be adjusted with a high level of accuracy according to the given circumstances and requirements. Furthermore, other advantages of the light emitting device according to the invention are equally applicable to the dimming method according to the invention.

In an embodiment the method comprises the further steps of providing a control device adapted for performing the step of dimming the at least two light sources and performing the step of dimming the at least two light sources by means of the control device. Thereby a method for dimming a light emitting device is provided which may be carried out in a very simple and convenient manner, either manually or automatically.

In an embodiment the light emitting device comprises a plurality of light sources, and the step of dimming comprises dimming at least two light sources of the plurality of light sources such as to emit light at different intensity levels, the intensity levels decreasing with increasing distance between each light source and the first light exit surface of the first light guide.

Thereby a method for dimming a light emitting device is provided with which a further variety of degrees of dimming are made available in that the light sources may be dimmed one by one, i.e. separately, to emit light at two or more different intensity levels, e.g. such that a first light source arranged at the largest distance, i.e. the farthest away, from the first light exit surface emits light at half the maximum possible intensity, a second light source arranged at the second largest distance from the first light exit surface emits light at three quarters of the maximum possible intensity and remaining light sources emit light at the maximum possible intensity.

In an embodiment the step of dimming comprises switching off groups of at least two light sources of the plurality of light sources one by one starting with the group of at least two light sources arranged at the largest distance from the first light exit surface of the first light guide. Thereby an even further degree of dimming is made possible.

In an embodiment the first light guide of the light emitting device comprises at least one further light exit surface, and the step of dimming comprises dimming the at least two light sources one by one starting with that of the at least two light sources being arranged at the largest distance from both the first light exit surface and the at least one further light exit surface. Thereby a method for dimming is provided with which a uniform dimming may be provided in the sense that the light emitted from both or all light exit surfaces is dimmed in an equal or substantially equal degree.

The invention also concerns a projector comprising a light emitting device according to the first aspect of the invention.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

FIGS. 15a through 15d show a schematic illustration of a first embodiment of a method according to the invention.

FIGS. 16a through 16d show a schematic illustration of a second embodiment of a method according to the invention.

FIGS. 17a through 17c show a schematic illustration of a third embodiment of a method according to the invention.

FIGS. 18a through 18d shows a schematic illustration of a fourth embodiment of a method according to the invention.

Figure 1:
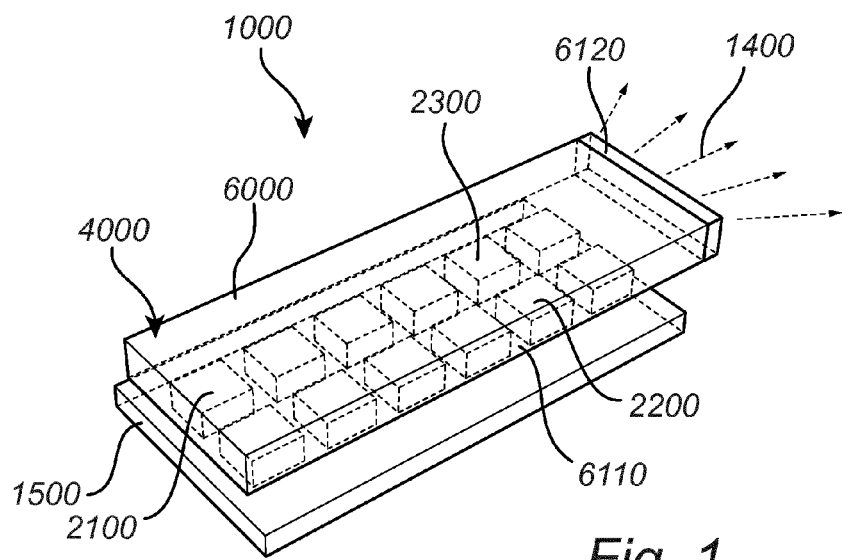
FIG. 1 shows a 3-dimensional perspective view of a light emitting device comprising an exit phosphor.

As illustrated in the figures, the sizes of layers, elements and regions are exaggerated for illustrative purposes and, thus, are provided to illustrate the general structures of embodiments of the present invention. Like reference numerals refer to like elements throughout, such that e.g. a light emitting device according to the invention is generally denoted 1, whereas different specific embodiments thereof are denoted by adding 01, 02, 03 and so forth to the general reference numeral. With regard to FIGS. 1 to 10 showing a number of features and elements which may be added to any one of the embodiments of a light emitting device according to the invention as set forth further below, generally "00" has been added to all elements except those specific to one of these Figures.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

The following description will start with general considerations regarding applications, suitable light sources and suitable materials for various elements and features of a light emitting device according to the invention. For this purpose a number of features and elements which may be added to any one of the embodiments of a light emitting device according to the invention as set forth further below will be described with reference to FIGS. 1 to 10. The specific embodiments of a light emitting device according to the invention will be described in detail with reference to FIGS. 11a to 21.

A light emitting device according to the invention may be used in applications including but not being limited to a lamp, a light module, a luminaire, a spot light, a flash light, a projector, a digital projection device, automotive lighting such as e.g. a headlight or a taillight of a motor vehicle, arena lighting, theater lighting and architectural lighting.

Light sources which are part of the embodiments according to the invention as set forth below, are adapted for, in operation, emitting light with a first spectral distribution. This light is subsequently coupled into a light guide or waveguide. The light guide or waveguide may convert the light of the first spectral distribution to another spectral distribution and guides the light to an exit surface. The light source may in principle be any type of point light source, but is in an embodiment a solid state light source such as a Light Emitting Diode (LED), a Laser Diode or Organic Light Emitting Diode (OLED), a plurality of LEDs or Laser Diodes or OLEDs or an array of LEDs or Laser Diodes or OLEDs, or a combination of these. The LED may in principle be an LED of any color, or a combination of these, but is in an embodiment a blue light source producing light source light in the blue color-range which is defined as a wavelength range of between 380 nm and 495 nm. In another embodiment, the light source is an UV or violet light source, i.e. emitting in a wavelength range of below 420 nm. In case of a plurality or an array of LEDs or Laser Diodes or OLEDs, the LEDs or Laser Diodes or OLEDs may in principle be LEDs or Laser Diodes or OLEDs of two or more different colors, such as, but not limited to, UV, blue, green, yellow or red.

The light source may be a red light source, i.e. emitting in a wavelength range of e.g. between 600 nm and 800 nm. Such a red light source may be e.g. a light source of any of the above mentioned types directly emitting red light or provided with a phosphor suitable for converting the light source light to red light. This embodiment is particularly advantageous in combination with a light guide adapted for converting the light source light to infrared (IR) light, i.e. light with a wavelength of more than about 800 nm and in a suitable embodiment with a peak intensity in the range from 810 to 850 nm. In an embodiment such a light guide comprises an IR emitting phosphor. A light emitting device with these characteristics is especially advantageous for use in night vision systems, but may also be used in any of the applications mentioned above.

Another example is combination of a first, red light source emitting light in a wavelength range between 480 nm and 800 nm and coupling this light into a luminescent rod or waveguide, and a second light source, emitting blue or UV or violet light, i.e. with a wavelength smaller than 480 nm, and also coupling its emitted light into the luminescent waveguide or rod. The light of the second light source is converted by the luminescent waveguide or rod to a wavelength range between 480 nm and 800 nm, and the light of the first light source coupled into the luminescent waveguide or rod will not be converted. In other words, the second light source emits UV, violet or blue light and is subsequently converted by the luminescent concentrator into light in the green-yellow-orange-red spectral region. In another embodiment the first light source emits in a wavelength range between 500 nm and 600 nm, and the light of the second light source is converted by the luminescent waveguide or rod to a wavelength range between 500 nm and 600 nm. In another embodiment the first light source emits in a wavelength range between 600 nm and 750 nm, and the light of the second light source is converted by the luminescent waveguide or rod to a wavelength range between 600 nm and 750 nm. In an embodiment the light of the first light source is coupled into the luminescent waveguide or rod at another surface, for example a surface opposite to an exit surface of the light, than a surface where the light of the second light source is coupled into the luminescent waveguide or rod. These embodiments provide a luminescent waveguide or rod emitting in the red light range with an increased brightness.

The light guides as set forth below in embodiments according to the invention generally may be rod shaped or bar shaped light guides comprising a height H, a width W, and a length L extending in mutually perpendicular directions and are in embodiments transparent, or transparent and luminescent. The light is guided generally in the length L direction. The height H is in embodiments <10 mm, in other embodiments <5 mm, in yet other embodiments <2 mm. The width W is in embodiments <10 mm, in other embodiments <5 mm, in yet other embodiments <2 mm. The length L is in embodiments larger than the width W and the height H, in other embodiments at least 2 times the width W or 2 times the height H, in yet other embodiments at least 3 times the width W or 3 times the height H. The aspect ratio of the height H:width W is typically 1:1 (for e.g. general light source applications) or 1:2, 1:3 or 1:4 (for e.g. special light source applications such as headlamps) or 4:3, 16:10, 16:9 or 256:135 (for e.g. display applications). The light guides generally comprise a light input surface and a light exit surface which are not arranged in parallel planes, and in embodiments the light input surface is perpendicular to the light exit surface. In order to achieve a high brightness, concentrated, light output, the area of light exit surface may be smaller than the area of the light input surface. The light exit surface can have any shape, but is in an embodiment shaped as a square, rectangle, round, oval, triangle, pentagon, or hexagon.

The generally rod shaped or bar shaped light guide can have any cross sectional shape, but in embodiments has a cross section the shape of a square, rectangle, round, oval, triangle, pentagon, or hexagon. Generally the light guides are cuboid, but may be provided with a different shape than a cuboid, with the light input surface having somewhat the shape of a trapezoid. By doing so, the light flux may be even enhanced, which may be advantageous for some applications.

The light guides may also comprise cylindrically shaped rods. In embodiments the cylindrically shaped rods have one flattened surface along the longitudinal direction of the rod and at which the light sources may be positioned for efficient incoupling of light emitted by the light sources into the light guide. The flattened surface may also be used for placing heat sinks. The cylindrical light guide may also have two flattened surfaces, for example located opposite to each other or positioned perpendicular to each other. In embodiments the flattened surface extends along a part of the longitudinal direction of the cylindrical rod.

The light guides as set forth below in embodiments according to the invention may also be folded, bended and/or shaped in the length direction such that the light guide is not a straight, linear bar or rod, but may comprise, for example, a rounded corner in the form of a 90 or 180 degrees bend, a U-shape, a circular or elliptical shape, a loop or a 3-dimensional spiral shape having multiple loops. This provides for a compact light guide of which the total length, along which generally the light is guided, is relatively large, leading to a relatively high lumen output, but can at the same time be arranged into a relatively small space. For example luminescent parts of the light guide may be rigid while transparent parts of the light guide are flexible to provide for the shaping of the light guide along its length direction. The light sources may be placed anywhere along the length of the folded, bended and/or shaped light guide.

Suitable materials for the light guides as set forth below according to embodiments of the invention are sapphire, polycrystalline alumina and/or undoped transparent garnets such as YAG, LuAG having a refractive index of n=1.7. An additional advantage of this material (above e.g. glass) is that it has a good thermal conductivity, thus diminishing local heating. Other suitable materials include, but are not limited to, glass, quartz and transparent polymers. In other embodiments the light guide material is lead glass. Lead glass is a variety of glass in which lead replaces the calcium content of a typical potash glass and in this way the refractive index can be increased. Ordinary glass has a refractive index of n=1.5, while the addition of lead produces a refractive index ranging up to 1.7.

The light guides as set forth below according to embodiments of the invention may comprise a suitable luminescent material for converting the light to another spectral distribution. Suitable luminescent materials include inorganic phosphors, such as doped YAG, LuAG, organic phosphors, organic fluorescent dyes and quantum dots which are highly suitable for the purposes of embodiments of the present invention as set forth below.

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide ($CuInS_2$) and/or silver indium sulfide ($AgInS_2$) can also be used. Quantum dots show very narrow emission band and thus they show saturated colors. Furthermore the emission color can easily be tuned by adapting the size of the quantum dots. Any type of quantum dot known in the art may be used in embodiments of the present invention as set forth below. However, it may be preferred for reasons of environmental safety and concern to use cadmium-free quantum dots or at least quantum dots having very low cadmium content.

Organic fluorescent dyes can be used as well. The molecular structure can be designed such that the spectral peak position can be tuned. Examples of suitable organic fluorescent dyes materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

The luminescent material may also be an inorganic phosphor. Examples of inorganic phosphor materials include, but are not limited to, cerium (Ce) doped YAG ($Y_3Al_5O_{12}$) or LuAG ($Lu_3A_{15}O_{12}$). Ce doped YAG emits yellowish light, whereas Ce doped LuAG emits yellow-greenish light. Examples of other inorganic phosphors materials which emit red light may include, but are not limited to ECAS and BSSN; ECAS being $Ca_{1-x}AlSiN_3$:Eu$x$ wherein $0<x\leq1$, in embodiments $0<x\leq0.2$; and BSSN being $Ba_{2-x-z}M_xSi_{5-y}Al_yN_{8-y}O_y$:Eu$_z$ wherein M represents Sr or Ca, $0\leq x\leq1$, $0<y\leq4$, and $0.0005\leq z\leq0.05$, and in embodiments $0\leq x\leq0.2$.

In embodiments of the invention as set forth below, the luminescent material is made of material selected from the group comprising $(M<I>_{(1-x-y)}M<II>_xM<III>_y)_3$ $(M<IV>_{(1-z)}M<V>_z)_5O_{12}$ where M<I> is selected from the group comprising Y, Lu or mixtures thereof, M<II> is selected from the group comprising Gd, La, Yb or mixtures thereof, M<III> is selected from the group comprising Tb, Pr, Ce, Er, Nd, Eu or mixtures thereof, M<IV> is Al, M<V> is selected from the group comprising Ga, Sc or mixtures thereof, and $0<x\leq1$, $0<y\leq0.1$, $0<z<1$, $(M<I>_{(1-x-y)}M<II>_xM<III>_y)_2O_3$ where M<I> is selected from the group comprising Y, Lu or mixtures thereof, M<II> is selected from the group comprising Gd, La, Yb or mixtures thereof, M<III> is selected from the group comprising Tb, Pr, Ce, Er, Nd, Eu, Bi, Sb or mixtures thereof, and $0<x\leq1$, $0<y\leq0.1$, $(M<I>_{(1-x-y)}M<II>_xM<III>_y)S_{(1-z)}$Se where M<I> is selected from the group comprising Ca, Sr, Mg, Ba or mixtures thereof, M<II> is selected from the group comprising Ce, Eu, Mn, Tb, Sm, Pr, Sb, Sn or mixtures thereof, M<III> is selected from the group comprising K, Na, Li, Rb, Zn or mixtures thereof, and $0<x\leq0.01$, $0<y\leq0.05$, $0\leq z<1$, $(M<I>_{(1-x-y)}M<II>_xM<III>_y)O$ where M<I> is selected from the group comprising Ca, Sr, Mg, Ba or mixtures thereof, M<II> is selected from the group comprising Ce, Eu, Mn, Tb, Sm, Pr or mixtures thereof, M<III> is selected from the group comprising K, Na, Li, Rb, Zn or mixtures thereof, and $0<x\leq0.1$, $0<y\leq0.1$, $(M<I>_{(2-x)}M<II>_xM<III>_2)O_7$ where M<I> is selected from the group comprising La, Y, Gd, Lu, Ba, Sr or mixtures thereof, M<II> is selected from the group comprising Eu, Tb, Pr, Ce, Nd, Sm, Tm or mixtures thereof, M<III> is selected from the group comprising Hf, Zr, Ti, Ta, Nb or mixtures thereof, and $0<x\leq1$, $(M<I>_{(1-x)}M<II>_xM<III>_{(1-y)}M<IV>_y)O_3$ where M<I> is selected from the group comprising Ba, Sr, Ca, La, Y, Gd, Lu or mixtures thereof, M<II> is selected from the group comprising Eu, Tb, Pr, Ce, Nd, Sm, Tm or mixtures thereof, M<III> is selected from the group comprising Hf, Zr, Ti, Ta, Nb or mixtures thereof, and M<IV> is selected from the group comprising Al, Ga, Sc, Si or mixtures thereof, and $0<x\leq0.1$, $0<y\leq0.1$, or mixtures thereof.

Other suitable luminescent materials are Ce doped Yttrium aluminum garnet (YAG, $Y_3Al_5O_{12}$) and Lutetium-Aluminum-Garnet (LuAG). A luminescent light guide may comprise a central emission wavelength within a blue color-range or within a green color-range or within a red color-range. The blue color-range is defined between 380 nanometer and 495 nanometer, the green color-range is defined between 495 nanometer and 590 nanometer, and the red color-range is defined between 590 nanometer and 800 nanometer.

A selection of phosphors which may be used in embodiments is given in table 1 below along with the maximum emission wavelength.

TABLE 1

| Phosphor | Maximum emission wavelength [nm] |
|---|---|
| $CaGa_2S_4$: Ce | 475 |
| $SrGa_2S_4$: Ce | 450 |
| $BaAl_2S_4$: Eu | 470 |
| $CaF_2$: Eu | 435 |
| $Bi_4Si_3O_{12}$: Ce | 470 |
| $Ca_3Sc_2Si_3O_{12}$: Ce | 490 |

TABLE 1-continued

| Phosphor | Maximum emission wavelength [nm] |
|---|---|

The light guides as set forth below according to embodiments of the invention may comprise regions with a different density of suitable luminescent material for converting the light to another spectral distribution. In an embodiment a transparent light guide comprises two parts adjacent to each other and only one of which comprises a luminescent material and the other part is transparent or has a relatively low concentration of luminescent material. In another embodiment the light guide comprises yet another, third part, adjacent to the second part, which comprises a different luminescent material or a different concentration of the same luminescent material. The different parts may be integrally formed thus forming one piece or one light guide. In an embodiment a partially reflecting element may be arranged between the different parts of the light guide, for example between the first part and the second part. The partially reflecting element is adapted for transmitting light with one specific wavelength or spectral distribution and for reflecting light with another, different, specific wavelength or spectral distribution. The partially reflecting element may thus be a dichroic element such as a dichroic mirror.

In another embodiment (not shown) a plurality of wavelength converting regions of luminescent material is arranged at the light input surface of a transparent light guide above or on top of a plurality of light sources, such as LEDs. Thus the surface area of each of the plurality of wavelength converting regions correspond to the surface area of each of the plurality of light sources such that light from the light sources is coupled into the transparent light guide via the regions of luminescent material. The converted light is then coupled into the transparent part of the light guide and subsequently guided to the light exit surface of the light guide. The wavelength converting regions may be arranged on the light input surface or they may be formed in the light guide. The wavelength converting regions may form part of a homogeneous layer arranged on or in the light guide at the light input surface. Parts of the homogeneous layer extending between two neighboring wavelength converting regions may be transparent and may additionally or alternatively have the same refractive index as the wavelength converting regions. The different wavelength converting regions may comprise mutually different luminescent materials. The distance between the light sources and the luminescent regions may be below 2 mm, below 1 mm or below 0.5 mm.

In embodiments of the light emitting device according to the invention as set forth below a coupling structure or a coupling medium may be provided for efficiently coupling the light emitted by the light source into the light guide. The coupling structure may be a refractive structure having features, such as e.g. protrusions and recesses forming a wave shaped structure. The typical size of the features of the coupling structure is 5 µm to 500 µm. The shape of the features may be e.g. hemispherical (lenses), prismatic, sinusoidal or random (e.g. sand-blasted). By choosing the appropriate shape, the amount of light coupled into the light guide can be tuned. The refractive structures may be made by mechanical means such as by chiseling, sand blasting or the like. Alternatively, the refractive structures may be made by replication in an appropriate material, such as e.g. polymer or sol-gel material. Alternatively, the coupling structure may be a diffractive structure, where the typical size of the features of the diffractive coupling structure is 0.2 µm to 2 µm. The diffraction angles $\theta_{in}$ inside the light guide are given by the grating equation $\lambda/\Lambda = n_{in} \cdot \sin \theta_{in} - n_{out} \cdot \sin \theta_{out}$, where $\lambda$ is the wavelength of LED light, $\Lambda$ is the grating period, $n_{in}$ and $n_{out}$ are the refractive indices inside and outside the light guide, $\theta_{in}$ and $\theta_{out}$ are the diffraction angle inside and the incident angle outside the light guide, respectively. If we assume the same refractive index $n_{out}=1$ for low-index layer and coupling medium, we find, with the condition for total internal reflection $n_{in} \sin \theta_{in} = n_{out}$, the following condition: $\lambda/\Lambda = 1 - \sin \theta_{out}$, i.e. $\Lambda = \lambda$ for normal incidence $\theta_{out}=0$. Generally, not all other angles $\theta_{out}$ are diffracted into the light guide. This will happen only if its refractive index $n_{in}$ is high enough. From the grating equation it follows that for the condition $n_{in} \geq 2$ all angles are diffracted if $\Lambda = \lambda$. Also other periods and refractive indices may be used, leading to less light that is diffracted into the light guide. Furthermore, in general a lot of light is transmitted ($0^{th}$ order). The amount of diffracted light depends on the shape and height of the grating structures. By choosing the appropriate parameters, the amount of light coupled into the light guide can be tuned. Such diffractive structures most easily are made by replication from structures that have been made by e.g. e-beam lithography or holography. The replication may be done by a method like soft nano-imprint lithography. The coupling medium may e.g. be air or another suitable material.

Turning now to FIG. 1, a 3-dimensional perspective view of a light emitting device 1000 is shown comprising a light guide 4000 adapted for converting incoming light with a first spectral distribution to light with a second, different spectral distribution. The light guide 4000 shown in FIG. 1 comprises or is constructed as a wavelength converter structure 6000 having a first conversion part 6110 in the form of a UV to blue wavelength converter and a second conversion part 6120 in the form of a phosphor adapted to emit white light 1400 based on the blue light input from the first conversion part 6110. Hence, the light emitting device 1000 shown in FIG. 1 comprises a light source in the form of a plurality of LEDs 2100, 2200, 2300 emitting light in the UV to blue wavelength range. The LEDs 2100, 2200, 2300 are arranged on a base or substrate 1500. Particularly, the first conversion part 6110 comprises a polycrystalline cubic Yttrium Aluminum Garnet (YAG), doped with rare earth ions, in an embodiment Europium and/or Terbium, while the second conversion part 6120 comprises a yellow phosphor. This embodiment is advantageous in that the surface area of the light exit surface is smaller than the surface area required to build a light source consisting of direct light emitting LEDs. Thereby, a gain in etendue can be realized.

Alternatives for generating white light with a blue or UV light source include but are not limited to LEDs emitting blue light, which light is converted to green/blue light in the first conversion part 6110, which in turn is converted to white light by the second conversion part being provided as a red phosphor, and LEDs emitting blue light, which light is converted to green light in the first conversion part 6110, which in turn is mixed with red and blue light to generate a white LED source, wherein the mixing is achieved by means of a second conversion part in the form of a red phosphor in front of which a diffusor is arranged.

Figure 2:
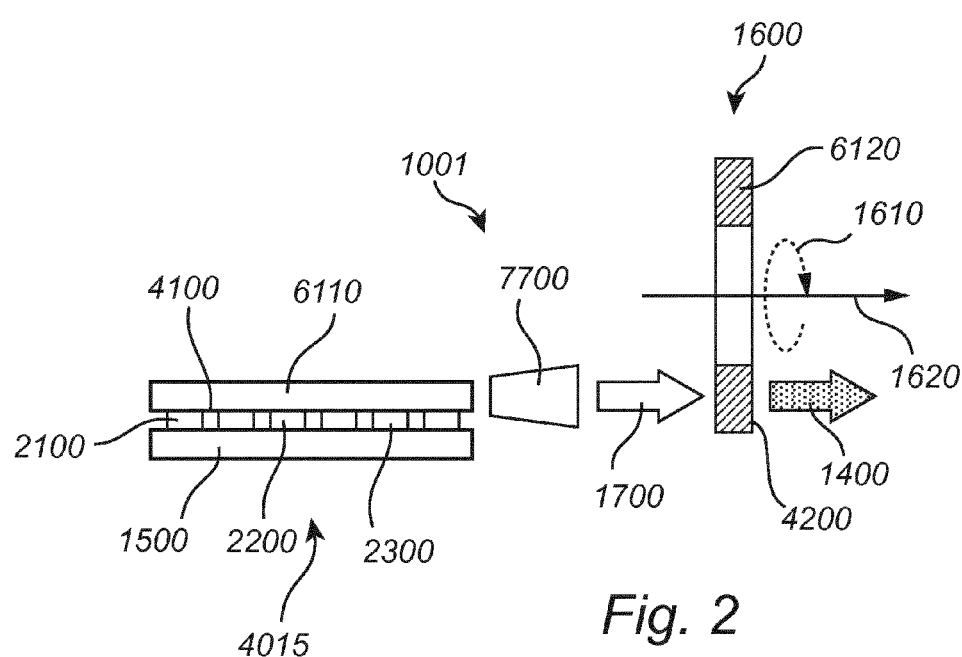
FIG. 2 shows a cross sectional view of a light emitting device comprising a phosphor wheel.

FIG. 2 shows a light emitting device 1001 comprising a light guide 4015 adapted for converting incoming light with a first spectral distribution to light with a second, different from the first, spectral distribution. The light guide 4015 shown in FIG. 2 comprises or is constructed as a wavelength converter structure having a second conversion part 6120 provided in the form of a rotatable phosphor wheel 1600, and it further comprises a coupling element 7700 arranged between the first conversion part 6110 and the second conversion part 6120 or phosphor wheel 1600.

The light emitting device 1001 further comprises a light source in the form of a plurality of LEDs 2100, 2200, 2300 arranged on a base or substrate 1500. The plurality of LEDs 2100, 2200, 2300 are used to pump the first conversion part 6110, which is in the embodiment shown made of a transparent material, to produce light 1700 having a third spectral distribution, such as green or blue light. The phosphor wheel 1600, which is rotating in a rotation direction 1610 about an axis of rotation 1620, is used for converting the light 1700 having the third spectral distribution to light 1400 having a second spectral distribution, such as red and/or green light. It is noted that in principle any combination of colors of the light 1700 and the light 1400 is feasible.

As shown in FIG. 2, illustrating the phosphor wheel 1600 in a cross sectional side view, the phosphor wheel 1600 is used in the transparent mode, i.e. incident light 1700 enters the phosphor wheel 1600 at one side, is transmitted through the phosphor wheel 1600 and emitted from an opposite side thereof forming the light exit surface 4200. Alternatively, the phosphor wheel 1600 may be used in the reflective mode (not shown) such that light is emitted from the same surface as the surface through which it enters the phosphor wheel.

The phosphor wheel 1600 may comprise only one phosphor throughout. Alternatively, the phosphor wheel 1600 may also comprise segments without any phosphor such that also part of the light 1700 may be transmitted without being converted. In this way sequentially other colors can be generated. In another alternative, the phosphor wheel 1600 may also comprise multiple phosphor segments, e.g. segments of phosphors emitting yellow, green and red light, respectively, such as to create a multi-colored light output. In yet another alternative, the light emitting device 1001 may be adapted for generating white light by employing a pixelated phosphor-reflector pattern on the phosphor wheel 1600.

In an embodiment the coupling element 7700 is an optical element suitable for collimating the light 1700 incident on the phosphor wheel 1600, but it may also be a coupling medium or a coupling structure such as e.g. the coupling medium or the coupling structure 7700 described above. The light emitting device 1001 may furthermore comprise additional lenses and/or collimators. For example, additional optics may be positioned such as to collimate the light emitted by the light sources 2100, 2200, 2300 and/or the light 1400 emitted by the light emitting device 1001.

Figure 3:
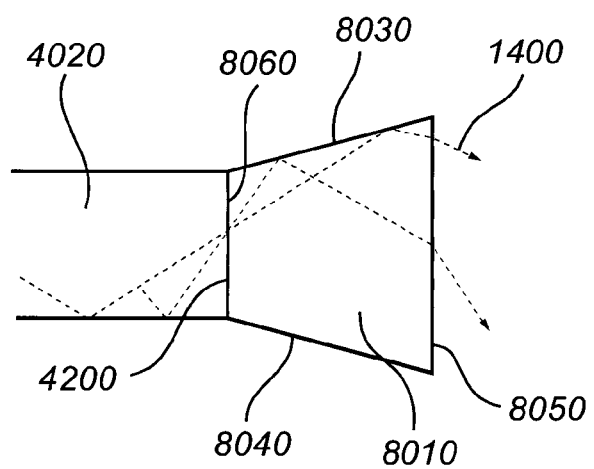
FIG. 3 shows side view of a light guide which is provided with an optical element at an exit surface.

FIG. 3 shows a light guide 4020 which comprises an optical element 8010 arranged with a light input facet 8060 in optical connection with a light exit surface 4200 of the light guide 4020. The optical element 8010 is made of a material having a high refractive index, in an embodiment a refractive index which is equal to or higher than that of the light guide 4020, and comprises a quadrangular cross section and two tapered sides 8030 and 8040. The tapered sides 8030 and 8040 are inclined outwardly from the light exit surface 4200 of the light guide 4020 such that the light exit facet 8050 of the optical element 8010 has a larger surface area than both the light input facet 8060 and the light exit surface 4200 of the light guide 4020. The optical element 8010 may alternatively have more than two, particularly four, tapered sides. In an alternative, the optical element 8010 has a circular cross section and one circumferential tapered side. With such an arrangement light will be reflected at the inclined sides 8030 and 8040 and has a large chance to escape if it hits the light exit facet 8050, as the light exit facet 8050 is large compared to the light input facet 8060. The shape of the sides 8030 and 8040 may also be curved and chosen such that all light escapes through the light exit facet 8050.

The optical element may also be integrally formed from the light guide 4020, for example by shaping a part of the light guide such that a predetermined optical element is formed at one of the ends of the light guide. The optical element may for example have the shape of a collimator, or may have a cross-sectional shape of a trapezoid and in an embodiment outside surfaces of the trapezoid shape are provided with reflective layers. Thereby the received light may be shaped such as to comprise a larger spot size while simultaneously minimizing the loss of light through other surfaces than the light exit surface, thus also improving the intensity of the emitted light. In another embodiment the optical element has the shape of a lens array, for example convex or concave lenses or combinations thereof. Thereby the received light may be shaped such as to form focused light, defocused light or a combination thereof. In case of an array of lenses it is furthermore feasible that the emitted light may comprise two or more separate beams each formed by one or more lenses of the array. In more general terms, the light guide may thus have differently shaped parts with different sizes. Thereby a light guide is provided with which light may be shaped in that any one or more of the direction of emission of light from the light exit surface, the beam size and beam shape of the light emitted from the light exit surface may be tuned in a particularly simple manner, e.g. by altering the size and/or shape of the light exit surface. Thus, a part of the light guide functions as an optical element.

The optical element may also be a light concentrating element (not shown) arranged at the light exit surface of the light guide. The light concentrating element comprises a quadrangular cross section and two outwardly curved sides such that the light exit surface of the light concentrating element has a larger surface area than the light exit surface of the light guide. The light concentrating element may alternatively have more than two, particularly four, tapered sides. The light concentrating element may be a compound parabolic light concentrating element (CPC) having parabolic curved sides. In an alternative, the light concentrating element has a circular cross section and one circumferential tapered side. If, in an alternative, the refractive index of the light concentrating element is chosen to be lower than that of the light guide (but higher than that of air), still an appreciable amount of light can be extracted. This allows for a light concentrating element which is easy and cheap to manufacture compared to one made of a material with a high refractive index. For example, if the light guide has a refractive index of n=1.8 and the light concentrating element has a refractive index of n=1.5 (glass), a gain of a factor of 2 in light output may be achieved. For a light concentrating element with a refractive index of n=1.8, the gain would be about 10% more. Actually, not all light will be extracted since there will be Fresnel reflections at the interface between the optical element or the light concentrating element and the external medium, generally being air. These Fresnel reflections may be reduced by using an appropriate anti-reflection coating, i.e. a quarter-lambda dielectric stack or moth-eye structure. In case the light output as function of position over the light exit facet is inhomogeneous, the coverage with anti-reflection coating might be varied, e.g. by varying the thickness of the coating.

One of the interesting features of a CPC is that the etendue (=$n^2 \times area \times solid\ angle$, where n is the refractive index) of the light is conserved. The shape and size of the light input facet of the CPC can be adapted to those of the light exit surface of the light guide and/or vice versa. A large advantage of a CPC is that the incoming light distribution is transformed into a light distribution that fits optimally to the acceptable etendue of a given application. The shape of the light exit facet of the CPC may be e.g. rectangular or circular, depending on the desires. For example, for a digital projector there will be requirements to the size (height and width) of the beam, as well as for the divergence. The corresponding etendue will be conserved in a CPC. In this case it will be beneficial to use a CPC with rectangular light input and exit facets having the desired height/width ratio of the display panel used. For a spot light application, the requirements are less severe. The light exit facet of the CPC may be circular, but may also have another shape (e.g. rectangular) to illuminate a particularly shaped area or a desired pattern to project such pattern on screens, walls, buildings, infrastructures etc. Although CPCs offer a lot of flexibility in design, their length can be rather large. In general, it is possible to design shorter optical elements with the same performance. To this end, the surface shape and/or the exit surface may be adapted, e.g. to have a more curved exit surface such as to concentrate the light. One additional advantage is that the CPC can be used to overcome possible aspect ratio mismatches when the size of the light guide is restrained by the dimensions of the LED and the size of the light exit facet is determined by the subsequent optical components. Furthermore, it is possible to place a mirror (not shown) partially covering the light exit facet of the CPC, e.g. using a mirror which has a 'hole' near or in its center. In this way the exit plane of the CPC is narrowed down, part of the light is being reflected back into the CPC and the light guide, and thus the exit etendue of the light would be reduced. This would, naturally, decrease the amount of light that is extracted from the CPC and light guide. However, if this mirror has a high reflectivity, like e.g. Alanod 4200AG, the light can be effectively injected back into the CPC and light guide, where it may be recycled by TIR. This will not change the angular distribution of the light, but it will alter the position at which the light will hit the CPC exit plane after recycling thus increasing the luminous flux. In this way, part of the light, that normally would be sacrificed in order to reduce the system etendue, can be re-gained and used to increase for example the homogeneity. This is of major importance if the system is used in a digital projection application. By choosing the mirror in the different ways, the same set of CPC and light guide can be used to address systems using different panel sizes and aspect ratio's, without having to sacrifice a large amount of light. In this way, one single system can be used for various digital projection applications.

By using any one of the above structures described with reference to FIG. 3, problems in connection with extracting light from the high-index light guide material to a low-index material like air, particularly related to the efficiency of the extraction, are solved.

Figure 4:
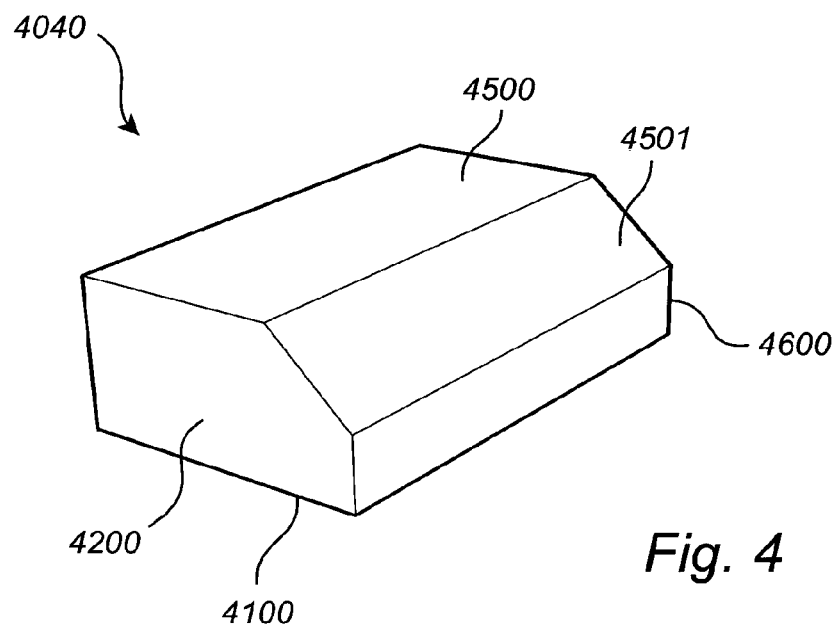
FIG. 4 shows a perspective view of a light guide which is shaped throughout its length such as to provide a shaped light exit surface.
Figure 5:
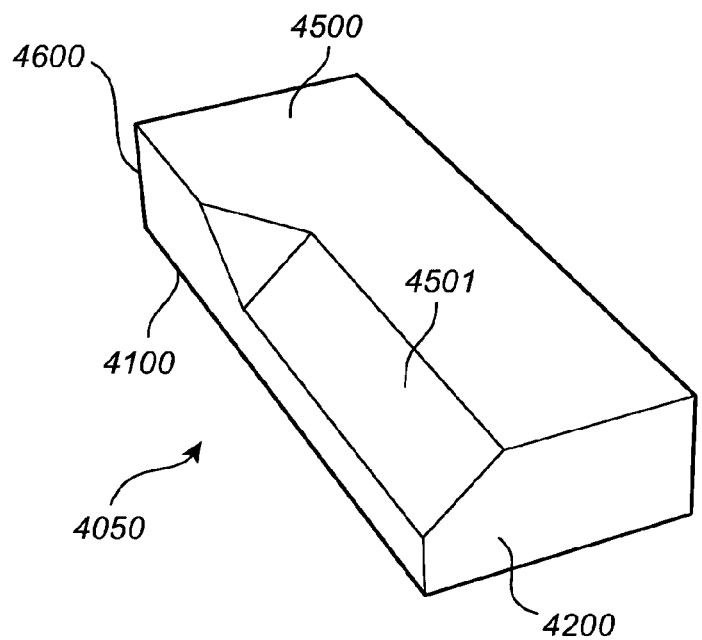
FIG. 5 shows a perspective view of a light guide which is shaped over a part of its length such as to provide a shaped light exit surface.

With reference to FIGS. 4 and 5 different possibilities for providing a light distribution having a particular shape will be described. FIG. 4 shows a perspective view of a light guide 4040 which is shaped throughout its length in order to provide a shaped light exit surface 4200. The light guide 4040 may be a transparent light guide or a light guide adapted for converting light with a first spectral distribution to light with a second spectral distribution. A part 4501 of the light guide 4040 extending throughout the length of the light guide 4040, particularly adjacent to the surface 4500 and opposite to the light input surface 4100, has been removed such as to provide the light guide 4040 with a shape corresponding to the desired shape of the light distribution at the light exit surface 4200, the shape extending throughout the entire length of the light guide 4040 from the light exit surface 4200 to the opposite surface 4600.

FIG. 5 shows a side view of a light guide 4050 which is shaped over a part of its length such as to provide a shaped light exit surface 4200. The light guide 4050 may be a transparent light guide or a light guide adapted for converting light with a first spectral distribution to light with a second spectral distribution. A part 4501 of the light guide 4050 extending over a part of the length of the light guide 4050 has been removed, particularly adjacent to the surface 4500 and opposite to the light input surface 4100, such as to provide the light guide 4050 with a shape corresponding to the desired shape of the light distribution at the light exit surface 4200, the shape extending over a part of the length of the light guide 4050 adjacent the light exit surface 4200.

Another part or more than one part of the light guide may be removed such as to provide for other shapes of the light exit surface. Any feasible shape of the light exit surface may be obtained in this way. Also, the light guide may be divided partly or fully into several parts having different shapes, such that more complex shapes may be obtained. The part or parts removed from the light guide may be removed by means of e.g. sawing, cutting or the like followed by polishing of the surface that is exposed after the removal of the part or parts. In another alternative a central part of the light guide may be removed, e.g. by drilling, such as to provide a hole in the light exit surface.

In an alternative embodiment, a light distribution having a particular shape may also be obtained by surface treating, e.g. roughening, a part of the light exit surface of the light guide, whilst leaving the remaining part of the light exit surface smooth. In this embodiment no parts of the light guide need to be removed. Likewise any combination of the above possibilities for obtaining a light distribution having a particular shape is feasible.

Figure 6:
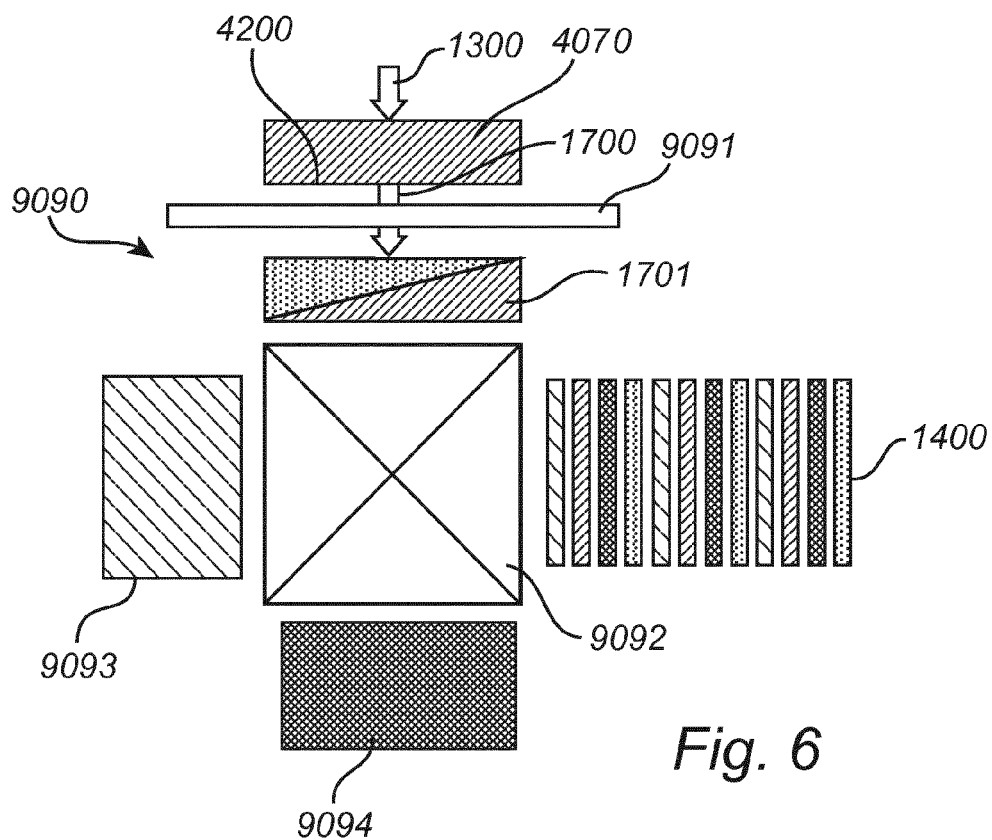
FIG. 6 shows a side view of a lighting system with a light guide and additional light sources and which is provided with a filter and a dichroic optical element.

FIG. 6 shows a side view of a lighting system, e.g. a digital projector, with a light guide 4070 which is adapted for converting incident light 1300 in such a way that the emitted light 1700 is in the yellow and/or orange wavelength range, i.e. roughly in the wavelength range of 560 nm to 600 nm. The light guide 4070 may e.g. be provided as a transparent garnet made of ceramic materials such as Ce-doped $(Lu,Gd)_3Al_5O_{12}$, $(Y,Gd)_3Al_5O_{12}$ or $(Y,Tb)_3Al_5O_{12}$. With higher Ce-content and/or higher substitution levels of e.g. Gd and/or Tb in favor of Ce, the spectral distribution of the light emitted by the light guide can be shifted to higher wavelengths. In an embodiment, the light guide 4070 is fully transparent.

At the light exit surface 4200 an optical element 9090 is provided. The optical element 9090 comprises a filter 9091 for filtering the light 1700 emitted from the light guide 4070 such as to provide filtered light 1701, at least one further light source 9093, 9094 and an optical component 9092 adapted for combining the filtered light 1701 and the light from the at least one further light source 9093, 9094 such as to provide a common light output 1400. The filter 9091 may be an absorption filter or a reflective filter, which may be fixed or switchable. A switchable filter may e.g. be obtained by providing a reflective dichroic mirror, which may be low-pass, band-pass or high-pass according to the desired light output, and a switchable mirror and placing the switchable mirror upstream of the dichroic mirror seen in the light propagation direction. Furthermore, it is also feasible to combine two or more filters and/or mirrors to select a desired light output. The filter 9091 shown in FIG. 6 is a switchable filter enabling the transmission of unfiltered yellow and/or orange light or filtered light, particularly and in the embodiment shown filtered red light, according to the switching state of the filter 9091. The spectral distribution of the filtered light depends on the characteristics of the filter 9091 employed. The optical component 9092 as shown may be a cross dichroic prism also known as an X-cube or it may in an alternative be a suitable set of individual dichroic filters.

In the embodiment shown two further light sources 9093 and 9094 are provided, the further light source 9093 being a blue light source and the further light source 9094 being a green light source. Other colors and/or a higher number of further light sources may be feasible too. One or more of the further light sources may also be light guides according to embodiments of the invention as set forth below. A further option is to use the light filtered out by the filter 9091 as a further light source. The common light output 1400 is thus a combination of light 1701 emitted by the light guide 4070 and filtered by the filter 9091 and light emitted by the respective two further light sources 9093 and 9094. The common light output 1400 may advantageously be white light.

The solution shown in FIG. 6 is advantageous in that it is scalable, cost effective and easily adaptable according to the requirements for a given application of a light emitting device according to embodiments of the invention.

Figure 7:
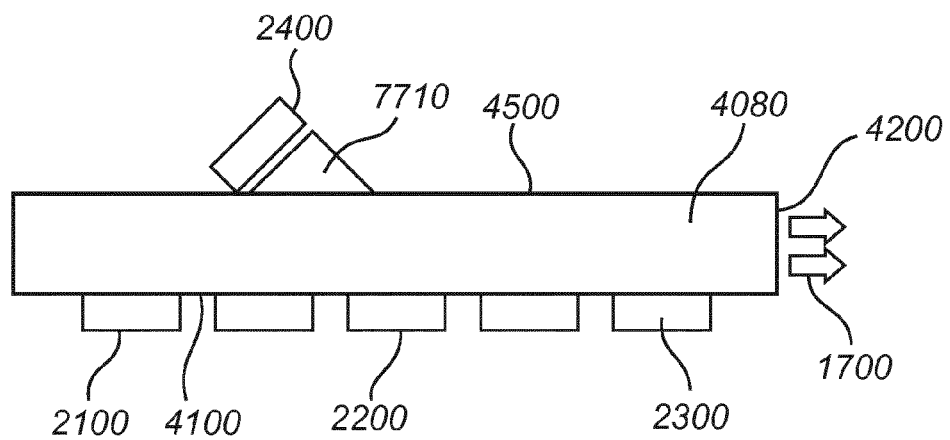
FIG. 7 shows a light guide provided with a second light source arranged at a surface of the light guide different from a first light input surface.

FIG. 7 shows a side view of a light guide 4080 which comprises first light sources 2100, 2200, 2300 emitting light with a first spectral distribution and being arranged adjacent the light input surface 4100 of the light guide 4080. The light guide 4080 furthermore comprises at least one second light source 2400 emitting light with a second spectral distribution, which is different from the first spectral distribution, and which is arranged adjacent to a surface 4500 of the light guide 4080 extending parallel and opposite to the light input surface 4100. The light guide 4080 is adapted for converting at least a part of the light with the first spectral distribution to light with a third spectral distribution different from the first spectral distribution and for guiding the light with the second spectral distribution without converting it. In this way the light 1700 emitted by the light guide 4080 through the light exit surface 4200 comprises a combination of at least the light with the second and third spectral distribution, respectively, and possibly also of the light with the first spectral distribution, as part of this light may remain unconverted. By way of a non-limiting example, the first spectral distribution may be in the wavelength range below 400 nm, the second spectral distribution may be in the red wavelength range, i.e. 500 to 800 nm and the third spectral distribution may be in the wavelength range 400 to 500 nm. By way of another non-limiting example, the first spectral distribution may be in the green wavelength range, i.e. 400 to 500 nm, the second spectral distribution may be in the red wavelength range, i.e. 500 to 800 nm and the third spectral distribution may be in the wavelength range 440 to 600 nm. By way of yet another non-limiting example the first light sources 2100, 2200, 2300 may be emitting in the wavelength range 440 to 480 nm, the light guide 4080 may convert the light emitted by the first light sources to light with a wavelength in the range 480 to 600 nm and the second light source 2400 may be emitting in the wavelength range 600 to 800 nm. It is noted that in principle all feasible combinations of first, second and third spectral distributions may be used. Thereby a simple and efficient way of producing white light is obtained.

As shown in FIG. 7 the light guide 4080 further comprises a coupling element 7710 adapted for coupling light from the second light source 2400 into the light guide 4080. The coupling element 7710 may be a coupling structure or coupling medium as described above. It is noted that the coupling element is an optional element, and may thus also be omitted, in which case the second light source may be arranged in direct optical contact with the light guide.

More than one second light source may be provided. In these embodiments it is furthermore feasible to provide second light sources emitting light with different spectral distributions such that second light sources arranged at different surfaces emit light having different spectral distributions. Furthermore, second light sources may alternatively or additionally be arranged at more than one of the surfaces of the light guide 4080 different from the light input surface 4100, e.g. at two different surfaces. For example the at least one second light source 2400 may be arranged at a surface opposite to the light exit surface 4200 of the light guide 4080.

Figure 8A:
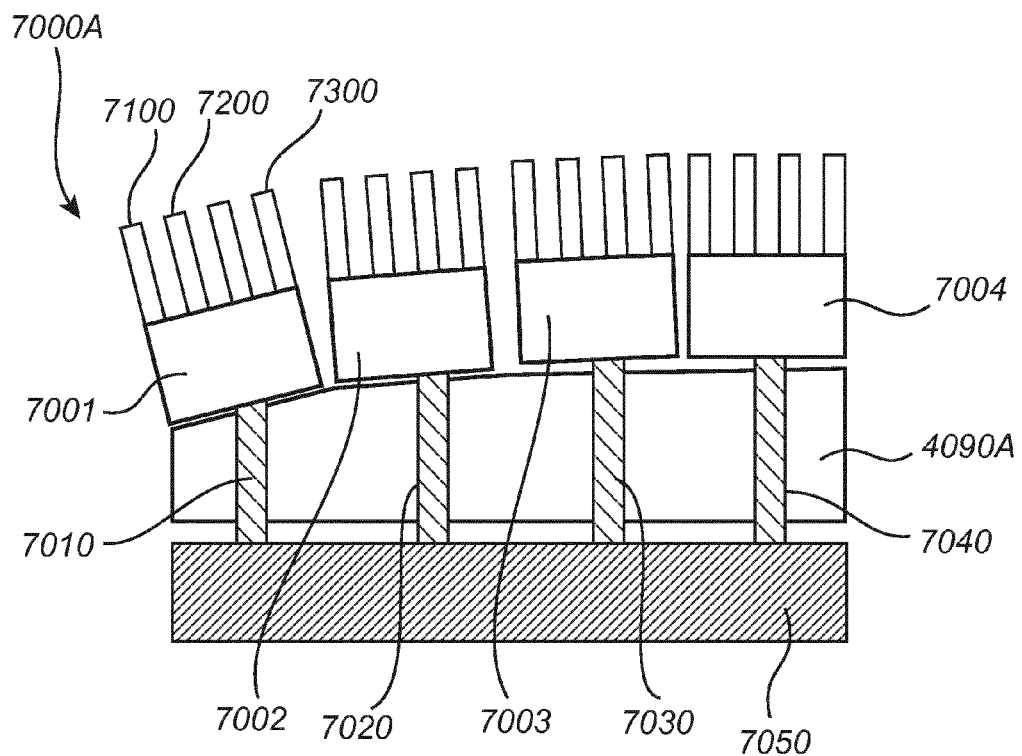
FIGS. 8A and 8B show light guides provided with a heat sink element arranged adjacent a surface of the light guide.
Figure 8B:
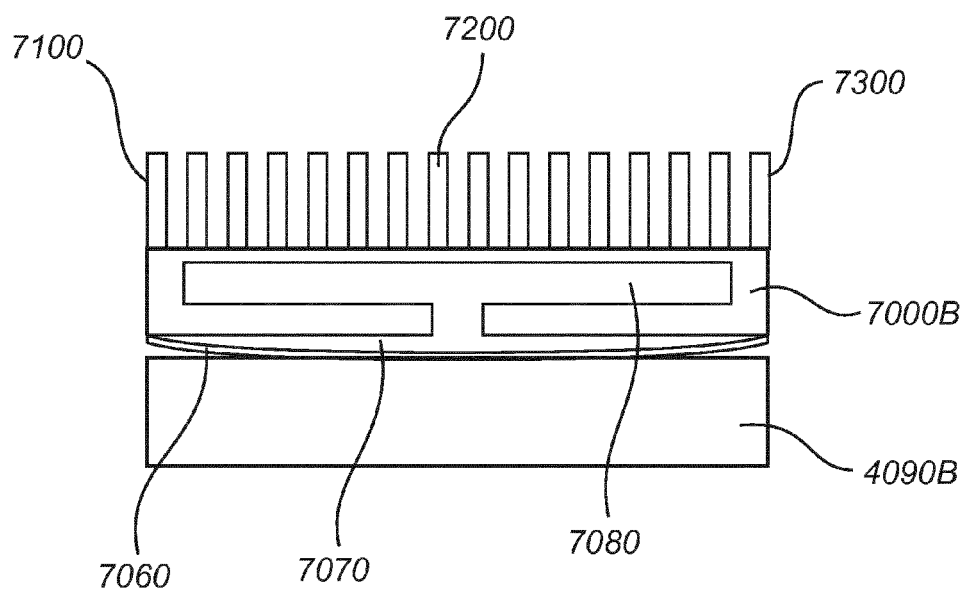

FIGS. 8A and 8B show a side view of a light guide 4090A and a light guide 4090B, respectively, that comprise a heat sink element 7000A, 7000B, respectively, arranged on one of the surfaces of the light guide 4090A, 4090B, respectively, different from the light input surface, in embodiments at a distance of about 30 μm or less therefrom. Irrespective of the embodiment the respective heat sink element 7000A, 7000B comprises fins 7100, 7200, 7300 for improved heat dissipation, the fins, however, being optional elements. Irrespective of the embodiment the respective heat sink element 7000A, 7000B is adapted to be conformable to the surface shape of the light guide, and is thus adapted for providing a conformal thermal contact over the whole contact area with the light guide. Thereby an increased thermal contact area and thus an improved cooling of the light guide is obtained and the existing tolerance limits on the positioning of the heat sink element become less critical.

FIG. 8A shows that heat sink element 7000A comprises a plurality of heat sink parts, here four heat sink parts 7001, 7002, 7003 and 7004, one or more of which, here all four, may be provided with fins. Obviously, the more heat sink parts the heat sink element 7000A comprises, the more precisely the heat sink element 7000 may be conformed to the surface of the light guide. Each heat sink part 7001, 7002, 7003, 7004 is adapted for providing a conformal thermal contact over the whole contact area with the light guide. The heat sink parts may be arranged in mutually different distances from the surface of the light guide. Furthermore, the heat sink element 7000A comprises a common carrier 7050 to which the heat sink parts 7001, 7002, 7003 and 7004 are attached individually by means of attachment elements 7010, 7020, 7030 and 7040, respectively. Alternatively each heat sink part may be assigned its own carrier. It is noted that these elements are optional.

FIG. 8B shows that heat sink element 7000B comprises a bottom part 7060 adapted to be conformable to the shape of the surface of the light guide 4090B at which it is to be arranged. The bottom part 7060 is flexible and may e.g. be a thermally conductive metal layer such as a copper layer. The heat sink element 7000B further comprises a thermally conductive layer 7070 arranged between the bottom element 7060 and the remainder of the heat sink element 7000B for improved flexibility and conformability of the heat sink element 7000B. The thermally conductive layer 7070 may e.g. be a thermally conductive fluid or paste. The thermally conductive layer 7070 is in an embodiment highly reflective and/or comprises a highly reflective coating. The heat sink element 7000B further comprises a fluid reservoir 7080 arranged inside the heat sink element 7000B for generating a fluid flow for improved heat dissipation. In an alternative, the fluid reservoir 7080 may also be arranged externally on the heat sink element 7000B, e.g. extending along a part of or the whole external periphery of the heat sink element 7000B. The fluid flow may be enhanced by means of a pump. It is noted that the conductive layer 7070 and the fluid reservoir 7080 are optional elements.

Irrespective of the embodiment, the heat sink element 7000A, 7000B may be made of a material selected from copper, aluminum, silver, gold, silicon carbide, aluminum nitride, boron nitride, aluminum silicon carbide, beryllium oxide, silicon-silicon carbide, aluminum silicon carbide, copper tungsten alloys, copper molybdenum carbides, carbon, diamond, graphite, and combinations of two or more thereof. Furthermore, a heat sink element combining features of the embodiments described above is feasible. Also, it is feasible to arrange a heat sink element according to any of the above embodiments at more than one surface of the light guide 4090A or 4090B.

Finally it is noted that the provision of a heat sink element as described above is especially advantageous in a light emitting device employing a light source emitting in the red wavelength range and/or being adapted for emitting light in the infrared wavelength range, e.g. by comprising an IR emitting phosphor.

FIGS. 9A to 9D show side views of a light guide 4010A, 4010B, 4010C and 4010D, respectively, comprising a light polarizing element 9001 arranged adjacent to the light exit surface 4200 of the respective light guide 4010A, 4010B, 4010C, 4010D as well as a reflective element 7400 arranged at a surface 4600 of the respective light guide 4010A, 4010B, 4010C, 4010D extending opposite to the light exit surface 4200. Thereby a polarized light source having a high brightness and a high efficiency may be obtained. Irrespective of the embodiment the polarizing element 9001 may be any one of a reflective linear polarizer and a reflective circular polarizer. Wire grid polarizers, reflective polarizers based on stack of polymer layers comprising birefringent layers are examples of reflective linear polarizers. Circular polarizers can be obtained using polymers in the so-called cholesteric liquid crystal phase to make so-called cholesteric polarizers transmitting only light of one polarization and of a specific spectral distribution. Alternatively or in addition to the reflective polarizers, polarizing beam splitters can also be employed. Furthermore scattering polarizers can also be used. In another embodiment, polarization by reflection may be used, e.g. by means of a polarizing element in the form of a wedge made of a material like glass, in which light is incident close to the Brewster angle. In yet another embodiment, the polarizing element 9001 may be a so-called polarized backlight such as described in WO 2007/036877 A2. In yet another embodiment, the polarizing element 9001 may be a polarizing structure.

Figure 9A:
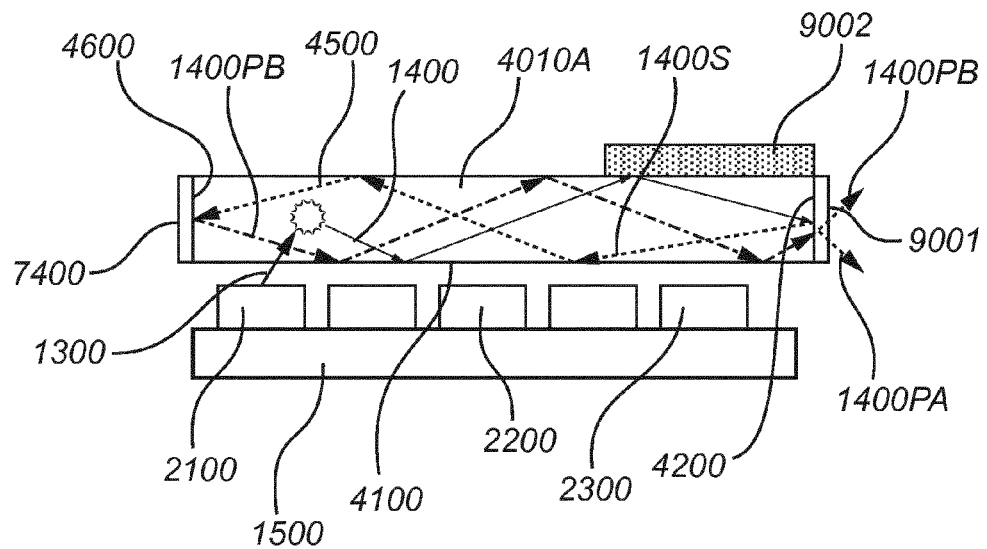
FIG. 9A to 9D show light guides provided with a polarizing element arranged adjacent to the light exit surface of the light guide.

FIG. 9A shows an embodiment in which the polarizing element 9001 is arranged on the light exit surface 4200 of the light guide 4010A. The light sources 2100, 2200, 2300 emit first light 1300 having a first spectral distribution, which is converted in the light guide 4010A into second light 1400 having a second spectral distribution. Due to the polarizing element 9001 only light of a first polarization, in this case p-polarized light 1400PA, is transmitted and emitted from the light exit surface 4200 and light of a second polarization, in this case s-polarized light 1400S, is reflected back into the light guide 4010A. The reflected s-polarized light 1400S is reflected by the reflective element 7400. When reflected, at least a part of the reflected s-polarized light 1400S is altered into p-polarized light 1400PB which is transmitted by the polarizing element 9001. Thus, a light output comprising only light with a first polarization, in this case p-polarized light 1400PA, 1400PB is obtained.

Furthermore, in this example the light guide 4010A comprises a ¼ lambda plate 9002 arranged at one of the surfaces extending between the light exit surface 4200 and the opposite surface 4600, in the embodiment shown partially covering the surface 4500. Alternatively, the ¼ lambda plate may cover the surface 4500 completely or it may comprise two or more separate segments. Alternatively or in addition thereto, further ¼ lambda plates may be arranged at one or more other of the surfaces extending between the light exit surface 4200 and the surface 4600. In yet another embodiment the ¼ lambda plate 9002 may be arranged between the light guide and the reflective element 7400 such that a gap is provided between the ¼ lambda plate and the light guide. The ¼ lambda plate 9002 may be used for converting light with a first polarization into light with a second polarization, particularly for converting circularly polarized light into linearly polarized light. It is noted, however, that irrespective of the embodiment the ¼ lambda plate 9002 is an optional element, and that it thus may also be omitted.

Figure 9B:
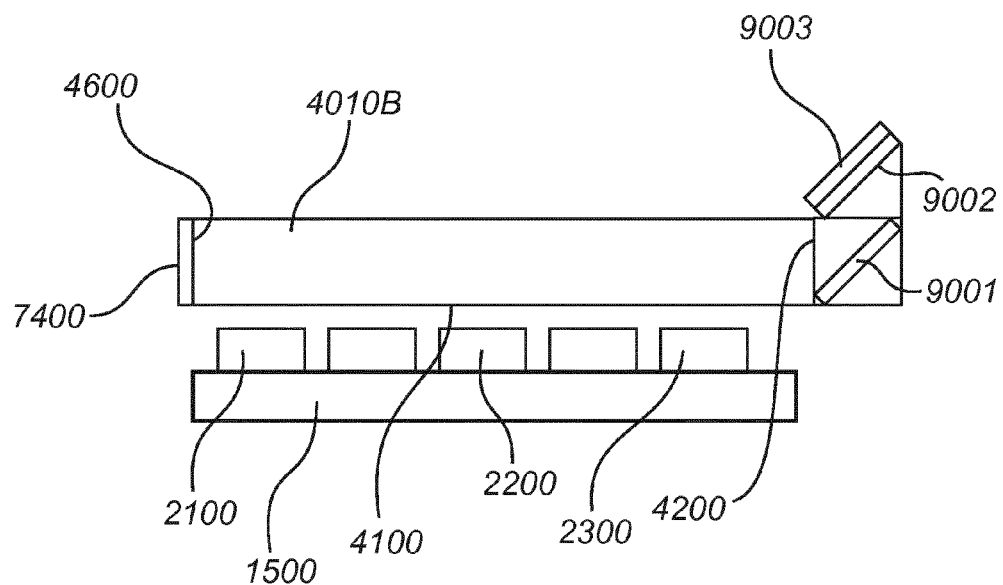

FIG. 9B shows an embodiment in which the polarizing element 9001 is arranged angled with respect to the light exit surface 4200, as shown in an angle of 45° relative to the light exit surface 4200 although any angle is in principle feasible. Furthermore, a ¼ lambda plate 9002 and a reflective element 9003 stacked on top of each other are arranged in the beam path downstream of the polarizing element 9001 such that they extend substantially in parallel with the polarizing element 9001. Thereby, reflected light with a first polarization is coupled out of the light guide 4010B and is thereupon altered into light with a second polarization by the polarizing element 9001, Subsequently the light with the second polarization is redirected by the reflective element 9003 and further polarized by the ¼ lambda plate 9002.

Figure 9C:
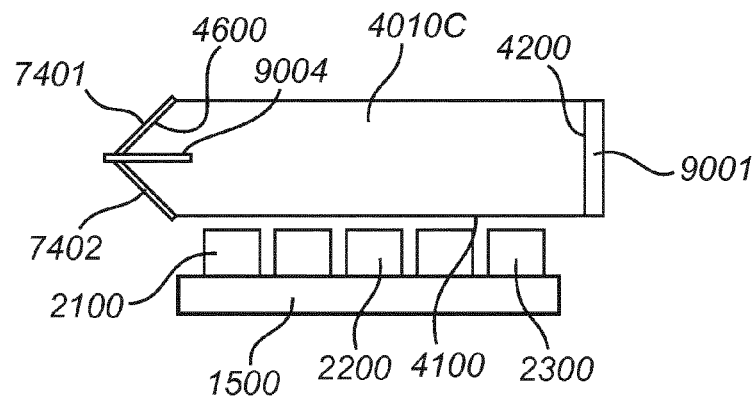

FIG. 9C shows an embodiment very similar to that shown in FIG. 9A but according to which the light guide 4010C as an alternative comprises a tapered surface 4600 opposite to the light exit surface 4200. The tapered surface 4600 is provided with reflective elements 4701, 4702 separated by an insert in the form of a ½ lambda plate 9004.

Figure 9D:
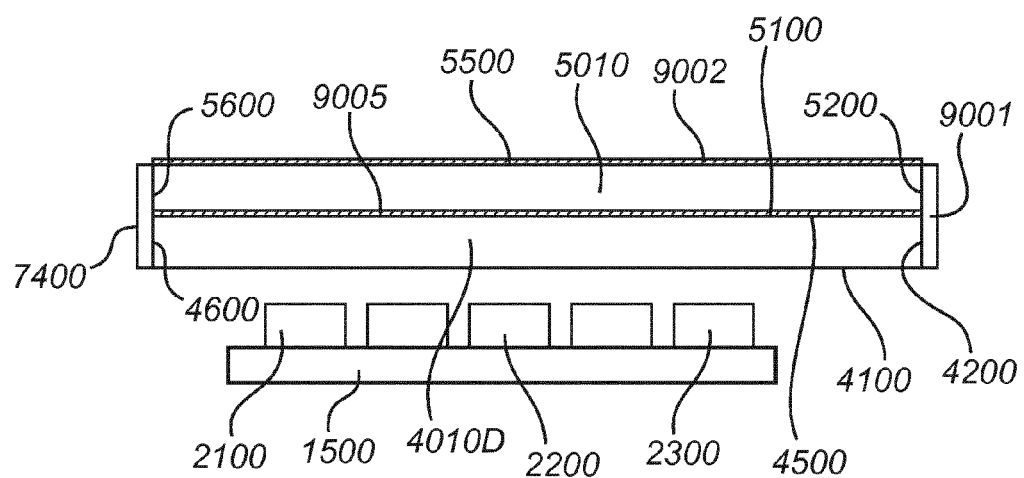

FIG. 9D shows an embodiment in which two light guides 4010D and 5010 are stacked such that the surface 4500 of the light guide 4010D and the light input surface 5100 of the light guide 5010 face each other and with a further polarizing element 9005 arranged in between and in optical contact with the light guides 4010D and 5010. A polarizing element 9001 is arranged on the light exit surfaces 4200 and 5200 of the light guides 4010D and 5010 and a reflective element 7400 is arranged on the surfaces 4600 and 5600 of the light guides 4010D and 5010 opposite the respective light exit surfaces 4200, 5200. The further polarizing element 9005 transmits light with a polarization being perpendicular to the polarization of the light transmitted by the polarizing element 9001. A ¼ lambda plate 9002 may be applied to at least a part of the surface 5500 of the light guide 5010.

In further alternative embodiments the polarizing element 9001 may be provided as a part of an optical element arranged at the light exit surface 4200 of the light guide. In one particular embodiment the polarizing element 9001 is then arranged such as to be located opposite to the light exit surface 4200 in the mounted position of the optical element. By way of example such an optical element may for instance be an optical element, a compound parabolic light concentrating element (CPC) or an optical element as described above. Alternatively, such an optical element may be a light mixing chamber. Particularly in case of a CPC a ¼ lambda plate may be arranged in the CPC opposite to the polarizing element 9001.

Figure 10:
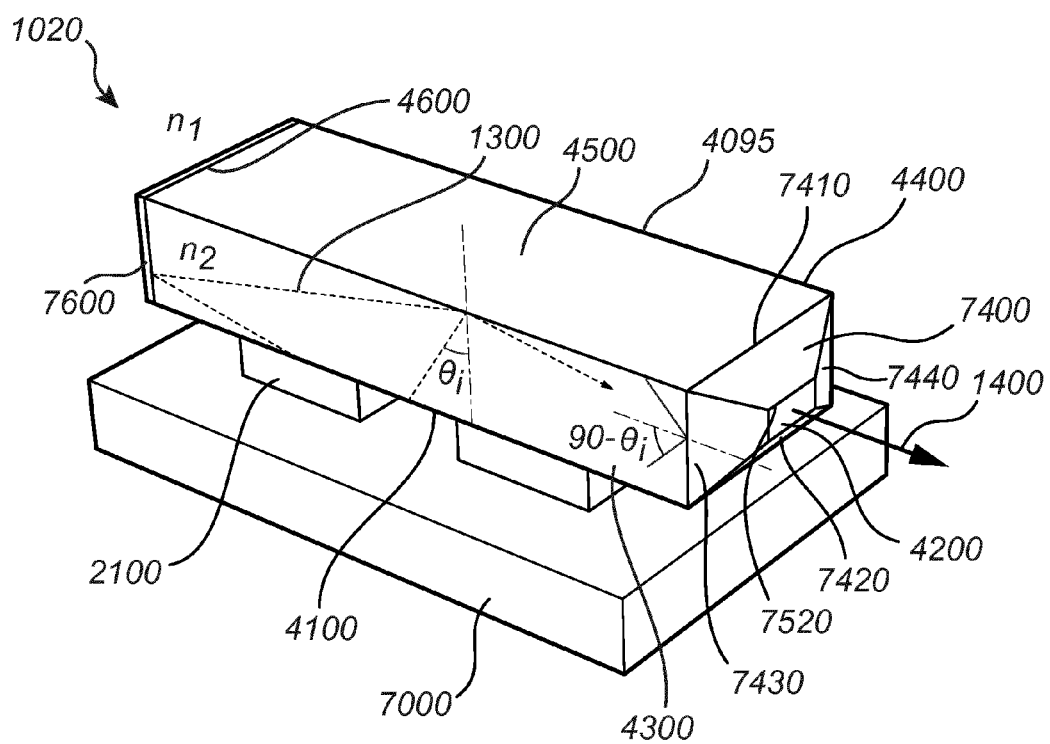
FIG. 10 shows a perspective view of a light emitting device having a tapered exit surface.

FIG. 10 shows a light emitting device 1020 comprising a light source 2100 comprising a plurality of LEDs and a light guide 4095. The light source 2100 is in this example arranged on a base or substrate in the form of a heat sink 7000, in embodiments made of a metal such as copper, iron or aluminum. It is noted that in other embodiments the base or substrate need not be a heat sink. The light guide 4095 is shown shaped generally as a bar or rod having a light input surface 4100 and a light exit surface 4200 extending in an angle different from zero, in this particular case perpendicular, with respect to one another such that the light exit surface 4200 is an end surface of the light guide 4095. The light input surface 4100 and the light exit surface 4200 may have different sizes, for example such that the light input surface 4100 is larger than the light exit surface 4200. The light guide 4095 further comprises a further surface 4600 extending parallel to and opposite the light exit surface 4200, the further surface 4600 thus likewise being an end surface of the light guide 4095. The light guide 4095 further comprises side surfaces 4300, 4400, 4500. The light guide 4095 may also be plate shaped, e.g. as a square or rectangular plate.

The light emitting device 1020 further comprises a first mirror element 7600 arranged at the further surface 4600 of the light guide 4095 as well as a second mirror element 7400 arranged at the light exit surface 4200 of the light guide 4095. As shown the first mirror element 7600 is arranged in optical contact with the light exit surface 4200 and the second mirror element 7600 is arranged in optical contact with the further surface 4600. Alternatively, a gap may be provided between one or both of the first and the second mirror element 7600 and 7400 and the further surface 4600 and the light exit surface 4200, respectively. Such a gap may be filled with e.g. air or an optical adhesive.

The light exit surface 4200 of the light guide 4095 is further provided with four inwardly tapered walls and a central flat part extending parallel with the further surface 4600. By "tapered wall" as used herein is meant a wall segment of the light exit surface 4200 which is arranged in an angle different from zero degrees to both the remaining part(s) of the light exit surface and to the surfaces of the light guide extending adjacent to the light exit surface. The walls are tapered inwardly, meaning that the cross-section of the light guide is gradually decreasing towards the exit surface. In this embodiment a second mirror element 7400 is arranged at, and is in optical contact with, the tapered walls of the light exit surface 4200. Hence, the second mirror element is provided with four segments 7410, 7420, 7430 and 7410 corresponding to and covering each of the tapered walls of the light exit surface 4200. A through opening 7520 corresponding to the central flat part of the light exit surface 4200 defines a transparent part of the light exit surface 4200 through which light may exit to be emitted from the light emitting device 1020.

In this way a light emitting device is provided in which the light rays that hit the second mirror element change angular direction such that more light rays are directed towards the light exit surface 4200 and light rays that previously would remain within the light guide 4095 due to TIR due to the change in angular directions now hit the light exit surface 4200 with angles smaller than the critical angle of reflection and consequently may leave the light guide through the through opening 7520 of the light exit surface 4200. Thereby the intensity of the light emitted by the light emitting device through the light exit surface 4200 of the light guide 4095 is increased further. Particularly, when the light guide is a rectangular bar, there will be light rays that hit the second mirror element at the exit surface perpendicularly, and as such cannot leave the bar since they remain bouncing between the two mirror elements. When one mirror element is tilted inwards, the light rays change direction after being reflected at that mirror element and may leave the light guide via the transparent part of the second mirror element. Thus, this configuration provides for improved guidance of light towards the central flat part of the light exit surface 4200 and thus the through hole 7520 in the second mirror element 7400 by means of reflection off of the tapered walls.

In alternative embodiments other numbers of tapered walls, such as less or more than four, e.g. one, two, three, five or six tapered walls, may be provided, and similarly not all tapered walls need be provided with a second mirror element or segments thereof. In other alternatives, one or more of the tapered walls may be uncovered by the second mirror element 7400, and/or the central flat part may be covered partly or fully by the second mirror element 7400.

As illustrated in the figures, the sizes of layers, elements and regions are exaggerated for illustrative purposes and, thus, are provided to illustrate the general structures of embodiments of the present invention. Like reference numerals refer to like elements throughout, such that e.g. a light emitting device according to the invention is generally denoted 1, whereas different specific embodiments thereof are denoted by adding 01, 02, 03 and so forth to the general reference numeral. With regard to FIGS. 1 to 8 showing a number of features and elements which may be added to any one of the embodiments of a light emitting device according to the invention, "00" has been added to all elements except those specific to one of these Figures.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

The following description will start with general considerations regarding applications, suitable light sources and suitable materials for various elements and features of a light emitting device according to the invention.

Thereupon a number of features and elements which may be added to any one of the embodiments of a light emitting device according to the invention will be described with reference to FIGS. 1 to 8.

Finally, a number of specific embodiments of a light emitting device according to the invention will be described in detail with reference to FIGS. 9 to 19.

A light emitting device according to the invention may be used in applications including but not being limited to a lamp, a light module, a luminaire, a spot light, a flash light, stage-lighting a projector, a digital projection device, automotive lighting such as e.g. a headlight or a taillight of a motor vehicle, arena lighting, theater lighting and architectural lighting.

The light emitting device according to the invention comprises a light source, which is adapted for, in operation, emitting light with a first spectral distribution. This light is subsequently coupled into a light guide or waveguide. The light guide or waveguide converts the light of the first spectral distribution to another spectral distribution and guides the light to an exit surface. The light source may in principle be any type of point light source, but is preferably a solid state light source such as a Light Emitting Diode (LED), a Laser Diode or Organic Light Emitting Diode (OLED), a plurality of LEDs or Laser Diodes or OLEDs or an array of LEDs or Laser Diodes or OLEDs. The LED may in principle be an LED of any color, but is preferably a blue light source producing light source light in the blue color-range which is defined as a wavelength range of between 380 nm and 495 nm. In another preferred embodiment, the light source is an UV or violet light source, i.e. emitting in a wavelength range of below 420 nm. In case of a plurality or an array of LEDs or Laser Diodes or OLEDs, the LEDs or Laser Diodes or OLEDs may in principle be LEDs or Laser Diodes or OLEDs of two or more different colors, such as, but not limited to, UV, blue, green, yellow or red.

Generally, light guides as used in the invention are rod shaped or bar shaped light guides comprising a height H, a width W, and a length L extending in mutually perpendicular directions and preferably being transparent and luminescent.

The height H is preferably <10 mm, more preferably <5, most preferably <2 mm. The width W is preferably <10 mm, more preferably <5, most preferably <2 mm. The length L is preferably larger than the width W and the height H, more preferably at least 2 times the width W or 2 times the height H, most preferably at least 3 times the width W or 3 times the height H. The aspect ratio of the Height H:Width W is typically 1:1 (for e.g. general light source applications) or 1:2, 1:3 or 1:4 (for e.g. special light source applications such as headlamps) or 4:3, 16:10, 16:9 or 256:135 (for e.g. display applications).

Generally light guides as used in the invention comprise a light input surface and a light exit surface. The light exit surface can have any shape, but is preferably shaped as a square, rectangle, round, oval, triangle, pentagon, or hexagon.

The generally rod shaped or bar shaped light guide can have any cross sectional shape, but preferably has a cross section the shape of a square, rectangle, round, oval, triangle, pentagon, or hexagon.

Generally, light guides as used in the invention are cuboid, but may be provided with a different shape than a cuboid, with the light input surface having somewhat the shape of a trapezoid. By doing so, the light flux may be even enhanced, which may be advantageous for some applications.

Suitable materials for light guides as used in the invention is sapphire, polycrystalline alumina and/or undoped transparent garnets such as YAG, LuAG having a refractive index of n=1.7. An additional advantage of this material (above e.g. glass) is that it has a good thermal conductivity, thus diminishing local heating. Other suitable materials include, but are not limited to, glass, quartz and transparent polymers. In another embodiment the light guide material is lead glass. Lead glass is a variety of glass in which lead replaces the calcium content of a typical potash glass and in this way the refractive index can be increased. Ordinary glass has a refractive index of n=1.5, while the addition of lead produces a refractive index ranging up to 1.7.

The light guide or waveguide comprises a luminescent material for converting the light to another spectral distribution. Suitable luminescent materials as used in the invention include inorganic phosphors, such as doped YAG, LuAG, organic phosphors, organic fluorescent dyes and quantum dots which are highly suitable for the purpose of the present invention.

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide (CuInS2) and/or silver indium sulfide (AgInS2) can also be used. Quantum dots show very narrow emission band and thus they show saturated colors. Furthermore the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having very low cadmium content.

Organic fluorescent dyes can be used as well. The molecular structure can be designed such that the spectral peak position can be tuned. Examples of suitable organic fluorescent dyes materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

Obviously, the luminescent material may also be an inorganic phosphor. Examples of inorganic phosphor materials include, but are not limited to, cerium (Ce) doped YAG (Y3Al5O12) or LuAG (Lu3Al5O12). Ce doped YAG emits yellowish light, whereas Ce doped LuAG emits yellow-greenish light. Examples of other inorganic phosphors materials which emit red light may include, but are not limited to ECAS and BSSN; ECAS being Ca1−xAlSiN3:Eux wherein 0<x≤1, preferably 0<x≤0.2; and BSSN being Ba2−x−zMxSi5−yAlyN8−yOy:Euz wherein M represents Sr or Ca, 0≤x≤1, 0≤y≤4, and 0.0005≤z≤0.05, and preferably 0≤x≤0.2.

According to a preferred embodiment of the present invention, the luminescent material is essentially made of material selected from the group comprising (M<I>1−x−yM<II>xM<III>y)3(M<IV>1−zM<V>z)5O12- where M<I> is selected from the group comprising Y, Lu or mixtures thereof, M<II> is selected from the group comprising Gd, La, Yb or mixtures thereof, M<III> is selected from the group comprising Tb, Pr, Ce, Er, Nd, Eu or mixtures thereof, M<IV> is Al, M<V> is selected from the group comprising Ga, Sc or mixtures thereof, and 0≤x≤1, 0≤y≤0.1, 0≤z≤1, (M<I>1−x−yM<II>x,M<III>y)2O3- where M<I> is selected from the group comprising Y, Lu or mixtures thereof, M<II> is selected from the group comprising Gd, La, Yb or mixtures thereof, M<III> is selected from the group comprising Tb, Pr, Ce, Er, Nd, Eu, Bi, Sb or mixtures thereof, and 0≤x≤1, 0≤y≤0.1, (M<I>1−x−yM<II>xM<III>y)S1−zSez- where M<I> is selected from the group comprising Ca, Sr, Mg, Ba or mixtures thereof, M<II> is selected from the group comprising Ce, Eu, Mn, Tb, Sm, Pr, Sb, Sn or mixtures thereof, M<III> is selected from the group comprising K, Na, Li, Rb, Zn or mixtures thereof, and 0≤x≤0.01, 0≤y≤0.05, 0≤z≤1, (M<I>1-x-yM<II>xM<III>y)O— where M<I> is selected from the group comprising Ca, Sr, Mg, Ba or mixtures thereof, M<II> is selected from the group comprising Ce, Eu, Mn, Tb, Sm, Pr or mixtures thereof, M<III> is selected from the group comprising K, Na, Li, Rb, Zn or mixtures thereof, and 0≤x≤0.1, 0≤y≤0.1, (M<I>2-xM<II>xM<III>2)O7- where M<I> is selected from the group comprising La, Y, Gd, Lu, Ba, Sr or mixtures thereof, M<II> is selected from the group comprising Eu, Tb, Pr, Ce, Nd, Sm, Tm or mixtures thereof, M<III> is selected from the group comprising Hf, Zr, Ti, Ta, Nb or mixtures thereof, and 0<=x<=1, (M<I>1-xM<II>xM<III>1-yM<IV>y)O3- where M<I> is selected from the group comprising Ba, Sr, Ca, La, Y, Gd, Lu or mixtures thereof, M<II> is selected from the group comprising Eu, Tb, Pr, Ce, Nd, Sm, Tm or mixtures thereof, M<III> is selected from the group comprising Hf; Zr, Ti, Ta, Nb or mixtures thereof, and M<IV> is selected from the group comprising Al, Ga, Sc, Si or mixtures thereof, and 0≤x≤0.1, 0≤y≤0.1, or mixtures thereof.

Particularly suitable luminescent materials, however, are Ce doped Yttrium aluminum garnet (YAG, $Y_3Al_5O_{12}$) and Lutetium-Aluminum-Garnet (LuAG).

Each of the two or more luminescent light guides comprises a different central emission wavelength within a blue color-range or within a green color-range or within a red color-range. The blue color-range is defined between 380 nanometer and 495 nanometer, the green color-range is defined between 495 nanometer and 590 nanometer, and the red color-range is defined between 590 nanometer and 800 nanometer.

The light emitting device according to the invention may comprise a coupling structure or a coupling medium for efficiently coupling the light emitted by the light source into the light guide.

The coupling structure is a refractive structure having features, such as e.g. protrusions and recesses forming a wave shaped structure. The typical size of the features of the coupling structure is 5 μm to 500 μm. The shape of the features may be e.g. hemispherical (lenses), prismatic, sinusoidal or random (e.g. sand-blasted). By choosing the appropriate shape, the amount of light coupled into the light guide can be tuned. The refractive structures may be made by mechanical means such as by chiseling, sand blasting or the like. Alternatively, the refractive structures may be made by replication in an appropriate material, such as e.g. polymer or sol-gel material.

Alternatively, the coupling structure may be a diffractive structure, where the typical size of the features of the diffractive coupling structure is 0.2 μm to 2 μm. The diffraction angles $\theta_{in}$ inside the light guide are given by the grating equation $\lambda/\Lambda = n_{in} \sin\theta_{in} - n_{out} \sin\theta_{out}$, where $\lambda$ is the wavelength of LED light, $\Lambda$ is the grating period, $n_{in}$ and $n_{out}$ are the refractive indices inside and outside the light guide, $\theta_{in}$ and $\theta_{out}$ are the diffraction angle inside and the incident angle outside the light guide, respectively. If we assume the same refractive index $n_{out}=1$ for low-index layer and coupling medium, we find, with the condition for total internal reflection $n_{in} \sin\theta_{in} = n_{out}$, the following condition: $\lambda/\Lambda = 1 - \sin\theta_{out}$, i.e. $\Lambda = \lambda$ for normal incidence $\theta_{out} = 0$. Generally, not all other angles $\theta_{out}$ are diffracted into the light guide. This will happen only if its refractive index $n_{in}$ is high enough. From the grating equation it follows that for the condition $n_{in} \geq 2$ all angles are diffracted if $\Lambda = \lambda$. Also other periods and refractive indices may be used, leading to less light that is diffracted into the light guide. Furthermore, in general a lot of light is transmitted ($0^{th}$ order). The amount of diffracted light depends on the shape and height of the grating structures. By choosing the appropriate parameters, the amount of light coupled into the light guide can be tuned.

Such diffractive structures most easily are made by replication from structures that have been made by e.g. e-beam lithography or holography. The replication may be done by a method like soft nano-imprint lithography.

The coupling medium may e.g. be air or another suitable material.

Turning now to FIG. 1, a 3-dimensional perspective view of a light emitting device 1000 according to the invention is shown comprising a light guide 400 adapted for converting incoming light with a first spectral distribution to light with a second, different spectral distribution.

The light guide 400 shown in FIG. 1 differs from the remaining embodiments described herein in that it comprises or is constructed as a wavelength converter structure 6000 having a first conversion part 61100 in the form of a UV to blue wavelength converter and a second conversion part 61200 in the form of a phosphor adapted to emit white light 14 based on the blue light input from the first conversion part 61100.

Hence, the light emitting device 1000 shown in FIG. 1 comprises a light source in the form of a plurality of LEDs 2100, 2200, 2300 emitting light in the UV to blue wavelength range. The LEDs 2100, 2200, 2300 are arranged on a base or substrate 1500.

Particularly, the first conversion part 61100 consists of a polycrystalline cubic Yttrium Aluminum Garnet (YAG), doped with rare earth ions, preferably Europium and/or Terbium, while the second conversion part 61200 is a yellow phosphor. Preferably, the first conversion part 61100 is cubic or bar-shaped.

This embodiment is advantageous in that the surface area of the light exit surface is smaller than the surface area required to build a light source consisting of direct light emitting LEDs. Thereby, a gain in etendue can be realized.

Alternatives for generating white light with a blue or UV light source include but are not limited to:
LEDs emitting blue light, which light is converted to green/blue light in the first conversion part 61100, which in turn is converted to white light by the second conversion part being provided as a red phosphor, and
LEDs emitting blue light, which light is converted to green light in the first conversion part 61100, which in turn is mixed with red and blue light to generate a white LED source, wherein the mixing is achieved by means of a second conversion part in the form of a red phosphor in front of which a diffusor is arranged.

A selection of preferred phosphors is given in table 1 below along with the maximum wavelength which they are capable of emitting.

TABLE 1

| Phosphor | Maximum emission wavelength [nm] |
|---|---|
| CaGa2S4: Ce | 475 |
| SrGa2S4: Ce | 450 |
| BaAl2S4: Eu | 470 |
| CaF2: Eu | 435 |
| Bi4Si3O12: Ce | 470 |
| Ca3Sc2Si3O12: Ce | 490 |

TABLE 1-continued

| Phosphor | Maximum emission wavelength [nm] |
| --- | --- |

FIGS. 2 and 3 show a light emitting device 1001 according to the invention comprising a light guide 401 and adapted for converting incoming light with a first spectral distribution to light with a second, different from the first, spectral distribution.

The light guide 401 shown in FIGS. 2 and 3 differs from the remaining embodiments described herein in that it comprises or is constructed as a wavelength converter structure having a second conversion part 61200 provided in the form of a rotatable phosphor wheel 16, and in that it further comprises a coupling element 700 arranged between the first conversion part 61100 and the second conversion part 61200 or phosphor wheel 16.

The light emitting device 1001 further comprises a light source in the form of a plurality of LEDs 2100, 2200, 2300 arranged on a base or substrate 1500.

The plurality of LEDs 2100, 2200, 2300 are used to pump the first conversion part 61100, which is in the embodiment shown made of a transparent material, to produce light 1700 having a third spectral distribution, such as green or blue light. The phosphor wheel 16, which is rotating in a rotation direction 161 about an axis of rotation 162, is then used for converting the light 1700 to light 1400 having a second spectral distribution, such as red and/or green light. It is noted that in principle any combination of colors of the light 1700 and the light 1400 is feasible.

As shown in FIG. 2, illustrating the phosphor wheel 16 in a cross sectional side view, the phosphor wheel 16 is used in the transparent mode, i.e. incident light 1700 enters the phosphor wheel 16 at one side, is transmitted through the phosphor wheel 16 and emitted from an opposite side thereof forming the light exit surface 4200.

Alternatively, the phosphor wheel 16 may be used in the reflective mode, i.e. such that light is emitted from the same surface as the surface through which it enters the phosphor wheel 16, cf. FIG. 3 illustrating the phosphor wheel 16 in a cross sectional top view.

The phosphor wheel 16 may comprise one phosphor throughout. Alternatively, the phosphor wheel 16 may also comprise segments without any phosphor such that also part of the light 1700 may be transmitted without being converted. In this way sequentially other colors can be generated. In another alternative, the phosphor wheel 16 may also comprise multiple phosphor segments, e.g. segments of phosphors emitting yellow, green and red light, respectively, such as to create a multi-colored light output. In yet another alternative, the light emitting device 1001 may be adapted for generating white light by employing a pixelated phosphor-reflector pattern on the phosphor wheel 16.

The coupling element 700 is preferably an optical element suitable for collimating the light 1700 incident on the phosphor wheel 16, but may also be a coupling medium or a coupling structure such as e.g. the coupling medium or the coupling structure 700 described above.

The light emitting device 1001 may furthermore comprise additional lenses and/or collimators. For example, additional optics may be positioned such as to collimate the light emitted by the light sources 2100, 2200, 2300 and/or the light 1400 emitted by the light emitting device 1001.

FIG. 4 shows a light guide 402 according to the invention. The light guide 402 may be a transparent light guide or a light guide adapted for converting light with a first spectral distribution to light with a second spectral distribution. The light guide 402 shown in FIG. 4 differs from the remaining embodiments described herein in that it comprises an optical element 801 arranged with a light input facet 806 in optical connection with a light exit surface 4200 of the light guide 402.

The optical element 801 is made of a material having a high refractive index, preferably a refractive index being equal to or higher than that of the light guide 402, and comprises a quadrangular cross section and two tapered sides 803 and 804. The tapered sides 803 and 804 are inclined outwards from the light exit surface 4200 of the light guide 402 such that the light exit facet 805 of the optical element 801 has a larger surface area than both the light input facet 806 and the light exit surface 4200 of the light guide 402. The optical element 801 may alternatively have more than two, particularly four, tapered sides. In a preferred alternative, the optical element 801 has a circular cross section and one circumferential tapered side.

With such an arrangement light will be reflected at the inclined sides 803 and 804 and has a large chance to escape if it hits the light exit facet 805, as the light exit facet 805 is large compared to the light input facet 806. The shape of the sides 803 and 804 may also be curved and chosen such that all light escapes through the light exit facet 805.

FIG. 5 shows a light guide 403 according to the invention. The light guide 403 may be a transparent light guide or a light guide adapted for converting light with a first spectral distribution to light with a second spectral distribution. The light guide 403 shown in FIG. 5 differs from the remaining embodiments described herein in that it comprises a light concentrating element 802 arranged at a light exit surface 4200 of the light guide 403.

The light concentrating element 802 is made of a material, such as a compound material, having high refractive index, preferably a refractive index being equal to or higher than that of the light guide 403, and comprises a quadrangular cross section and two curved sides 803 and 804. The curved sides 803 and 804 are curved outwards from the light exit surface 4200 of the light guide 403 such that the light exit surface 805 of the light concentrating element 802 has a larger surface area than the light exit surface 4200 of the light guide 403. The light concentrating element 802 may alternatively have more than two, particularly four, tapered sides. In a preferred alternative, the light concentrating element 802 has a circular cross section and one circumferential tapered side. Preferably, the curved sides 803, 804 are parabolic.

If, in an alternative, the refractive index of the light concentrating element 802 with curved sides 803 and 804 is chosen to be lower than that of the light guide 403 (but higher than that of air), still an appreciable amount of light can be extracted. This allows for a light concentrating element 802 which is easy and cheap to manufacture compared to one made of a material with a high refractive index. For instance, if the light guide 403 has a refractive index of n=1.8 and the light concentrating element 802 has a refractive index of n=1.5 (glass), a gain of a factor of 2 in light output may be achieved. For a light concentrating element 802 with a refractive index of n=1.8, the gain would be about 10% more.

Actually, not all light will be extracted since there will be Fresnel reflections at the interface between the optical element 801 or the light concentrating element 802 and the external medium, generally being air. These Fresnel reflections may be reduced by using an appropriate anti-reflection coating, i.e. a quarter-lambda dielectric stack or moth-eye structure. In case the light output as function of position over the light exit facet 805 is inhomogeneous, the coverage with anti-reflection coating might be varied, e.g. by varying the thickness of the coating.

By using any one of the above structures shown in FIGS. 4 and 5, problems in connection with extracting light from the high-index light guide material to a low-index material like air, particularly related to the efficiency of the extraction, are solved. The situation is different from that in a luminescent solar concentrator, where extraction is to a high-index solar cell. For instance, if the refractive index of the converter is n=1.8, the critical angle for total internal reflection (TIR) with respect to air is 34°. Light with this angle or larger angles with respect to the normal to the side surfaces will be guided to the exit surface by TIR. However, light with an angle of 34° will hit the exit surface at 56° (w.r.t. its normal) and will be reflected there. Only light with an angle smaller than 34° (w.r.t. the normal to the exit surface) will escape. Light with an angle between 34° and 56° would circulate forever in a perfect light guide.

One of the interesting features of a compound parabolic light concentrating element (CPC) 802 as shown in FIG. 5 is that the etendue (=$n^2 \times$area$\times$solid angle, where n is the refractive index) of the light is conserved. The shape and size of the light input facet 806 of the CPC can be adapted to those of the light exit surface 4200 of the light guide 403 and/or vice versa. A large advantage of a CPC is that the incoming light distribution is transformed into a light distribution that fits optimally to the acceptable etendue of a given application. The shape of the light exit facet 805 of the CPC may be e.g. rectangular or circular, depending on the desires.

For instance, for a digital projector there will be requirements to the size (height and width) of the beam, as well as for the divergence. The corresponding etendue will be conserved in a CPC. In this case it will be beneficial to use a CPC with rectangular light input and exit facets 806 and 805 having the desired height/width ratio of the display panel used.

For a spot light application, the requirements are less severe. The light exit facet 805 of the CPC may be circular, but may also have another shape (e.g. rectangular) to illuminate a particularly shaped area or a desired pattern to project such pattern on screens, walls, buildings, infrastructures etc.

Although CPCs offer a lot of flexibility in design, their length can be rather large. In general, it is possible to design shorter optical elements with the same performance. To this end, the surface shape and/or the exit surface may be adapted, e.g. to have a more curved exit surface such as to concentrate the light.

One additional advantage is that the CPC can be used to overcome possible aspect ratio mismatches when the size of the light guide 403 is restrained by the dimensions of the LED and the size of the light exit facet 805 is determined by the subsequent optical components.

Furthermore, it is possible to place a mirror (not shown) partially covering the light exit facet 805 of the CPC, e.g. using a mirror which has a 'hole' near or in its center. In this way the exit plane of the CPC is narrowed down, part of the light is being reflected back into the CPC and the light guide, and thus the exit etendue of the light would be reduced. This would, naturally, decrease the amount of light that is extracted from the CPC and light guide. However, if this mirror has a high reflectivity, like e.g. Alanod 4200AG, the light can be effectively injected back into the CPC and light guide, where it may be recycled by TIR. This will not change the angular distribution of the light, but it will alter the position at which the light will hit the CPC exit plane after recycling thus increasing the luminous flux. In this way, part of the light, that normally would be sacrificed in order to reduce the system etendue, can be re-gained and used to increase for example the homogeneity.

This is of major importance if the system is used in a digital projection application. By choosing the mirror in the different ways, the same set of CPC and light guide can be used to address systems using different panel sizes and aspect ratio's, without having to sacrifice a large amount of light. In this way, one single system can be used for various digital projection applications.

In many applications, such as spot lighting and automotive lighting, it is desired to obtain a light distribution having a particular shape such as to comply with particular requirements given for such applications. For example, for automotive lighting there are requirements specified in the law that are related to the illumination profile of automotive head lights. Also, obtaining a light distribution having a particular shape may be desirable for decorative or aesthetic reasons.

With reference to FIGS. 6 to 8 different possibilities for providing a light distribution having a particular shape will be described.

FIG. 6 shows a perspective view of a light guide 404 according to the invention which is shaped throughout its length in order to provide a shaped light exit surface 4200. The light guide 404 may be a transparent light guide or a light guide adapted for converting light with a first spectral distribution to light with a second spectral distribution.

As may be seen, a part 4501 of the light guide 404 extending throughout the length of the light guide 404, particularly adjacent to the surface 4500 and opposite to the light input surface 4100, has been removed such as to provide the light guide 404 with a shape corresponding to the desired shape of the light distribution at the light exit surface 4200, the shape extending throughout the entire length of the light guide 404 from the light exit surface 4200 to the opposite surface 4600.

FIG. 7 shows a side view of a light guide 405 according to the invention which is shaped over a part of its length such as to provide a shaped light exit surface 4200. The light guide 405 may be a transparent light guide or a light guide adapted for converting light with a first spectral distribution to light with a second spectral distribution.

As may be seen, a part 4501 of the light guide 405 extending over a part of the length of the light guide 405, particularly adjacent to the surface 4500 and opposite to the light input surface 4100, has been removed such as to provide the light guide 405 with a shape corresponding to the desired shape of the light distribution at the light exit surface 4200, the shape extending over a part of the length of the light guide 405 adjacent the light exit surface 4200.

Another part or more than one part of the light guide may be removed such as to provide for other shapes of the light exit surface. Any feasible shape of the light exit surface may be obtained in this way. Also, the light guide may be divided partly or fully into several parts having different shapes, such that more complex shapes may be obtained. The part or parts removed from the light guide may be removed by means of e.g. sawing, cutting or the like followed by polishing of the surface that is exposed after the removal of the part or parts. In another alternative a central part of the light guide may be removed, e.g. by drilling, such as to provide a hole in the light exit surface.

In an alternative embodiment shown in FIG. 8, a light distribution having a particular shape may also be obtained by surface treating, e.g. roughening, a part 4201 of the light exit surface 4200 of the light guide 406, whilst leaving the remaining part of the light exit surface 4200 smooth. In this embodiment no parts of the light guide 406 need to be removed.

Likewise any combination of the above possibilities for obtaining a light distribution having a particular shape is feasible.

In the following embodiments of a light emitting device according to the invention will be described with reference to FIGS. 9-11 to 12-4, subsequent to which methods for dimming according to the invention will be described with reference to FIGS. 13-5 to 19-21. It should be noted that the light emitting device according to the invention may comprise any of the technical features and/or light guides according to the embodiments described above with reference to FIGS. 1 to 10.

FIGS. 9-11a and 9-11b shows two side views of a first embodiment of a light emitting device 1 according to the invention in a) a full power mode (FIG. 9a) and b) a power saving mode (FIG. 9b). The light emitting device 1 comprises four light sources 21, 22, 23, 24 and a light guide 4.

Generally, and irrespective of the embodiment, each of the two or more light sources of the light emitting device is a solid state light source, such as a LED. Suitable types of light sources and particularly LEDs are described above. Also, it is noted that the light emitting device according to the invention may in principle comprise any number of light sources equal to or greater than two. It is furthermore noted that the light sources, preferably in an embodiment, emit light having the same spectral distribution. Embodiments in which the light sources emit light having two or more different spectral distributions, e.g. in the red, green and blue wavelength range, respectively, are however also feasible.

The light sources 21, 22, 23, 24 are arranged on a base or substrate (not shown for the sake of simplicity) in the form of a heat sink, preferably for example made of a metal such as copper, iron or aluminum. The heat sink may comprise fins for improved heat dissipation. It is noted that in other embodiments the base or substrate does not need to be a heat sink. It is also noted that the base or substrate is not an essential feature, and in yet other embodiments the base or substrate may therefore be omitted.

The first light guide 4 is shown shaped generally as a bar or rod having a first light input surface 41, which extends substantially parallel to the main direction in which the light is waveguided in the first light guide 4, and a first light exit surface 42 extending perpendicular to one another such that the light exit surface 42 is an end surface of the light guide 4. The light guide 4 further comprises a further surface 46 extending parallel to and opposite the light exit surface 42, the further surface 46 thus likewise being an end surface of the light guide 4. The light guide 4 further comprises three further side surfaces of which two are denoted 43 and 44 in the figures, while the surface extending parallel with and opposite to the first light input surface 41 is not visible in the figures. The light guide 4 may also be plate shaped, e.g. in the form of a square or rectangular plate. The light sources 21, 22, 23, 24 are arranged along or at the first light input surface 41. Thus, the light sources 21, 22, 23, 24 are arranged along the main waveguiding direction of the light in the first light guide 4.

Alternative configurations of the light emitting device according to the invention are also feasible, for example in which the light exit surface 42 and the further surface 46 are mutually opposite side surfaces and the light input surface 41 is an end surface. Also it is noted that generally the first light input surface 41 and a first light exit surface 42 do not need to extend perpendicular with respect to each other, but in any event they do extend in an angle different from zero in relation to each other.

Furthermore, the first light guide 4 comprises a transparent material, a luminescent material, a luminescent garnet, a doped garnet, a light concentrating material or a combination thereof, suitable materials and garnets being described above. Thereby a light emitting device having a light guide with particularly good wavelength conversion properties is provided.

For example, in an embodiment the first light guide 4 is a transparent light guide. The term "transparent light guide" as used in this text refers to the scattering property of the material and thus not to the absorbance of the material. Thus the material may be highly absorbing but may show a high transparency. The transparency can be measured by using a wavelength where the material shows no absorption. A parallel beam of light can be used and the transmitted intensity can be measured by integrating over an angular range extending up to 2 degrees before and after placing the sample in the beam. In the calculation interface reflection losses are subtracted. Preferentially In embodiments the transparency is at least 80%, alternatively the transparency is at least 90%, alternatively the transparency is at least 95% or alternatively the transparency is at least 99%. By providing a light guide comprising a transparent material a light emitting device is provided with which the loss of light is further lowered as less or even no light is absorbed in the light guide.

Preferably In an embodiment, however, the first light guide 4 is a transparent light guide comprising a material adapted for converting light with one spectral distribution to light with another spectral distribution. The material adapted for converting light with one spectral distribution to light with another spectral distribution may be arranged at a surface of the first light guide 4 or it may be embedded in the first light guide 4. For instance the first light guide 4 may be a transparent light guide comprising one or more luminescent elements arranged at the light guide or at a surface of the light guide, for example between the light sources and the light input surface 41 of the first light guide 4.

The light emitting device 4 further comprises a control device 90 connected to the light sources by means of a suitable connection 91. The control device 90 may be any suitable control device known in the art. The control device 90 is capable of controlling the current supplied to the light sources 21, 22, 23, 24, and thereby the intensity with which the light sources emit light individually. The connection 91 may be a wired connection or a wireless connection.

The light emitting device 1 in this embodiment further comprises a first reflective element 76 arranged at the further surface 46 of the light guide 4 as well as second and third reflective elements 77, 78 arranged at the surfaces 44 and 43, respectively, of the first light guide 4. As shown the reflective elements 76, 77 and 78 are arranged in optical contact with the further surface 46 and the surfaces 44 and 43, respectively. Alternatively, a gap may be provided between one or more of the first, second and third reflective elements 76, 77 and 78 and the further surface 46 and the surfaces 44 and 43, respectively. Such a gap may be filled with e.g. air or an optical adhesive. It is noted that in this embodiment the reflective element 76 is needed to ensure that that there is effectively only one single light exit surface. The reflective elements 77, 78 are optional. The reflective elements 77, 78 may be used in embodiments where not all light source light is converted to converted light. Light source light which is not converted is then reflected by the reflective elements and directed back into the light guide and can subsequently be converted to converted light.

The first, second and third reflective element 76, 77 and 78 may be any suitable reflective element such as e.g. a mirror plate, a mirror foil or a mirror coating which may be glued, e.g. by means of an optical adhesive, coated or deposited onto the further surface 46 and the surfaces 44 and 43, respectively.

Figure 11A:
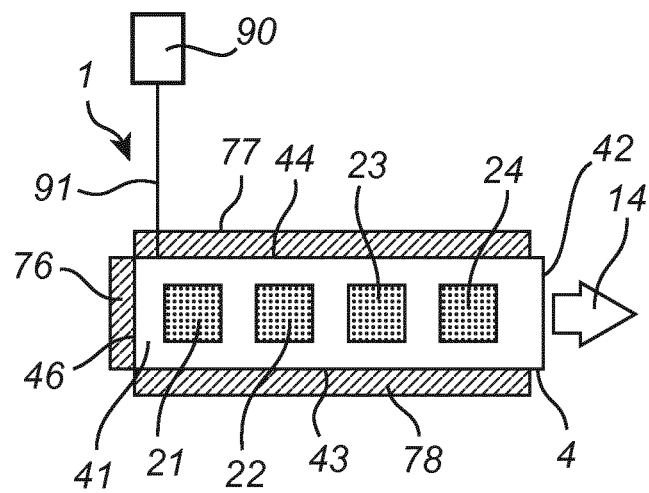
FIGS. 11a and 11b show two side views of a first embodiment of a light emitting device according to the invention in a) a full power mode and b) a power saving mode.
Figure 11B:
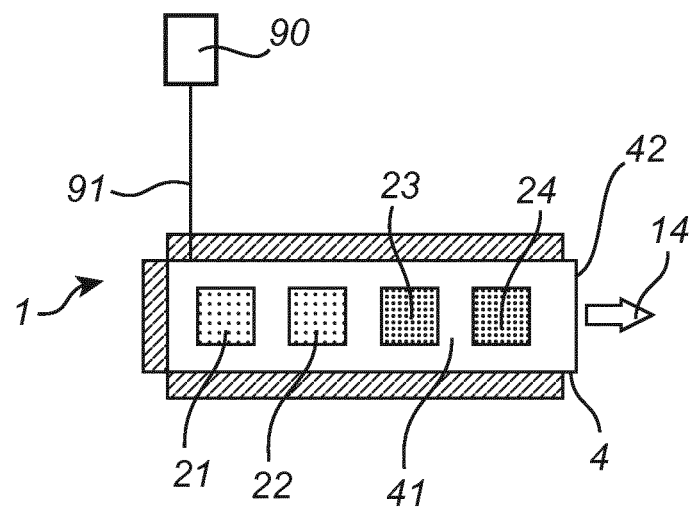

The first, second and third reflective elements 76, 77 and 78, which are shown as mirror plates in FIG. 9a 11a shown as mirror plates, cover substantially the complete surface area of the further surface 46 and the surfaces 44 and 43, respectively. In other embodiments, the first, second and third reflective elements 76, 77 and 78 cover only a part of the surface area of the further surface 46 and the surfaces 44 and 43, respectively.

With reference to FIGS. 9a 11a and 9b11b, a light emitting device according to the invention generally operates as explained in the following. Light having a first spectral distribution is emitted by the light sources 21, 22, 23, 24. The light having the first spectral distribution is then coupled into the first light guide 4 at the first light input surface 41. At least a part of the light with the first spectral distribution is converted by the light guide 4 to light 14 having a second spectral distribution. Finally, the light 14 having the second spectral distribution is coupled out of the first light guide 4 at the first light exit surface 42, and is thus emitted by the light emitting device 1.

In the full power mode a) shown in FIG. 9a11a, all four light sources 21, 22, 23, 24 emit light at maximum intensity. In the power saving mode b) shown in FIG. 9b11b, the light emitting device 1 is dimmed by means of a method according to the invention such that the two light sources 21, 22 arranged at the largest distance, i.e. the farthest away, from the first light exit surface 42 are switched off. In this case the thickness of the arrow, which generally illustrates the emitted light 14 with the second spectral distribution, illustrates the intensity of the emitted light.

Furthermore, it is noted that in alternative embodiments a light emitting device according to the invention may also comprise more than one light guide, i.e. a first light guide and one or more further light guides, and in such embodiments light sources may or may not be arranged at or on a light input surface of each of the further light guides.

Turning now to FIGS. 102a and 102b, two side views of a second embodiment of a light emitting device 101 according to the invention are shown in a) a full power mode and b) a power saving mode.

The light emitting device 101 shown in FIGS. 120a and 102b differs from that shown in FIGS. 9a 11a and 9b 11b first and foremost in that a first light guide 401 comprises one further light exit surface, in the embodiment shown being the surface 46 extending parallel to and opposite the first light exit surface 42. Thus light 141, 142 with the second spectral distribution is emitted from both the further light exit surface 46 and the first light exit surface 42.

Thus in the full power mode a) shown in FIG. 102a all four light sources 21, 22, 23, 24 emit light at maximum intensity. In the power saving mode b) shown in FIG. 102b, the light emitting device 101 is dimmed by means of a method according to the invention such that the two light sources 22, 23 arranged closest to a point P on the first light input surface 41 are switched off. The point P is located where the distance perpendicular to both the light exit surfaces 42 and 46 is the largest possible, the distance perpendicular to each of the light exit surfaces 42 and 46 being given equal weight. That is in this embodiment the point P is located at the center of the light input surface 41, but may in principle be located anywhere on a line extending through the center of the light input surface 41 and parallel to the light exit surfaces 42 and 46. In this case also, the thickness of the arrows, which generally illustrate the emitted light 141, 142 with the second spectral distribution, illustrates the intensity of the emitted light.

Furthermore, the light emitting device 101 shown in FIGS. 120a and 102b comprises a coupling element 7 for coupling light source light into the first light guide 401 arranged at the surface 44 as well as a coupling medium 8 for coupling light into the first light guide 401 arranged at the surface 43. Suitable coupling structures and coupling media are described above. In alternative embodiments, a similar coupling structure or coupling medium may be arranged at the first light input surface 41. By providing a coupling element or a coupling medium, a light emitting device is provided with which light emitted by the at least two light sources may be coupled into the first light guide in a particularly efficient manner and with particularly low or possibly no coupling losses.

Alternatively or in addition thereto the light emitting device may comprise at least one of a reflective element arranged at a surface of the light emitting device.

Turning now to FIGS. 113a and 113b, two side views of a third embodiment of a light emitting device 102 according to the invention are shown in a) a full power mode and b) a power saving mode.

The light emitting device 102 shown in FIGS. 113a and 113b differs from that shown in FIGS. 9a 11a and 9b 11b first and foremost in that a first light guide 402 comprises two further light exit surfaces, in the embodiment shown being the surface 46 extending parallel to and opposite the first light exit surface 42 and the surface 43 extending between the first light exit surface 42 and the surface 46. Thus, light 141, 142, 143 with the second spectral distribution is emitted from both the two further light exit surfaces 43 and 46 and the first light exit surface 42.

Furthermore, the light emitting device 102 comprises an array of four times four, i.e. a total of sixteen, light sources. It is noted that in alternative embodiments the light emitting device may comprise any other size of array of light sources comprising any number of light sources equal to or greater than two.

Thus in the full power mode a) shown in FIG. 113a all light sources 21, 22, 23, 24 emit light at maximum intensity. In the power saving mode b) shown in FIG. 11b13b, the light emitting device 102 is dimmed by means of a method according to the invention such that the light sources 21, 22 arranged closest to a point P on the first light input surface 41 are switched off. The point P is located where the distance perpendicular to each of the light exit surfaces 42, 43 and 46 is the largest possible, the distance perpendicular to each of the light exit surfaces 42, 43 and 46 being given equal weight. That is in this embodiment the point P is located at the surface 44 of the first light guide 4 and on a line extending through the center of the light input surface 41 and parallel to the light exit surfaces 42 and 46. In this case also, the thickness of the arrows, which generally illustrate the emitted light 141, 142, 143 with the second spectral distribution, illustrates the intensity of the emitted light.

Figure 13A:
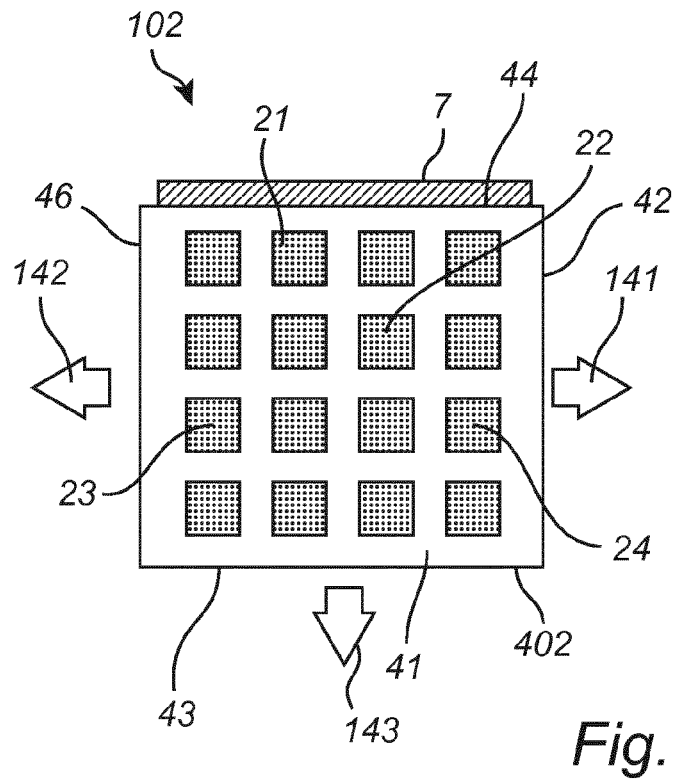
FIGS. 13a and 13b show two side views of a third embodiment of a light emitting device according to the invention in a) a full power mode and b) a power saving mode.

Furthermore, the light emitting device 103 shown in FIGS. 11a 13a and 131b comprises a coupling element 7 for coupling light source light into the first light guide 402 arranged at the surface 44 extending parallel to and opposite the further light exit surface 43.

Turning now to FIGS. 12a 14a and 12b14b, two side views of a fourth embodiment of a light emitting device 103 according to the invention are shown in a) a full power mode and b) a power saving mode.

The light emitting device 103 shown in FIGS. 12a 14a and 12b 14b differs from that shown in FIGS. 11a 13a and 11b 13b first and foremost in that a first light guide 403 comprises three further light exit surfaces, in the embodiment shown being the surface 46 extending parallel to and opposite the first light exit surface 42 and the surfaces 43 and 44 extending between the first light exit surface 42 and the surface 46. Thus, light 141, 142, 143, 144 with the second spectral distribution is emitted from both the three further light exit surfaces 43, 44 and 46 and the first light exit surface 42.

Figure 12A:
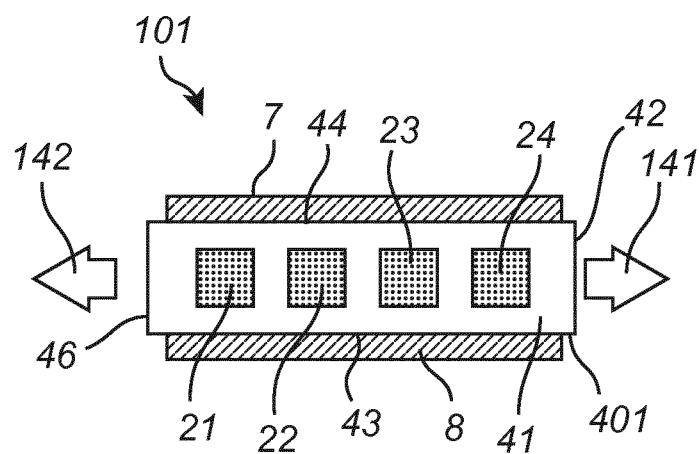
FIGS. 12a and 12b show two side views of a second embodiment of a light emitting device according to the invention in a) a full power mode and b) a power saving mode.
Figure 12B:
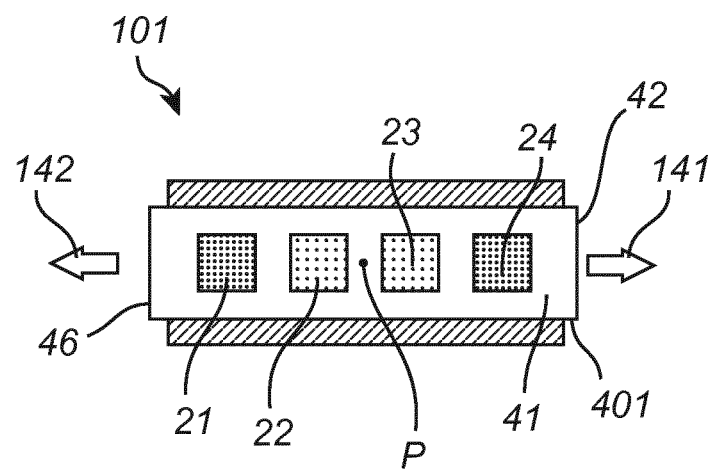
Figure 14A:
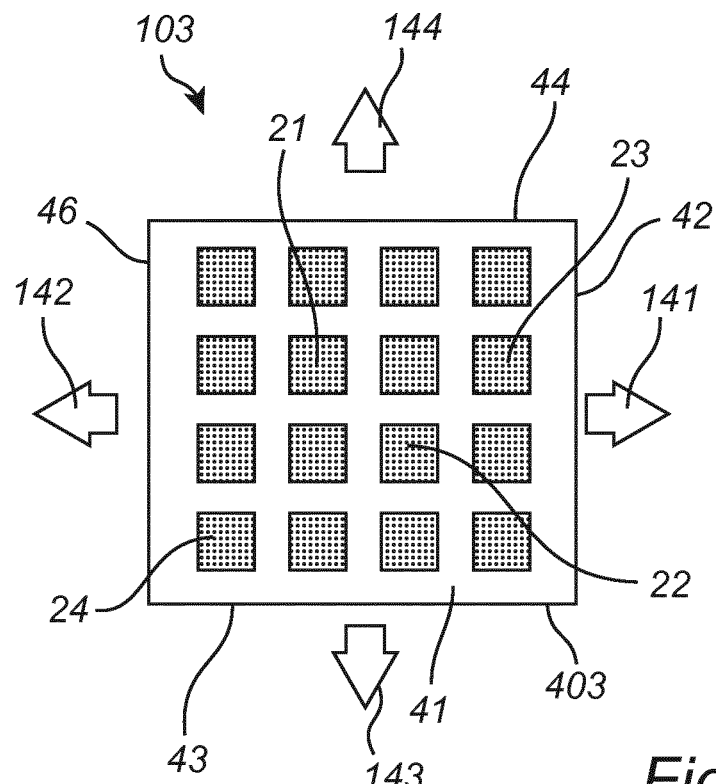
FIGS. 14a and 14b show two side views of a fourth embodiment of a light emitting device according to the invention in a) a full power mode and b) a power saving mode.

Thus in the full power mode a) shown in FIG. 12a 14a all light sources 21, 22, 23, 24 emit light at maximum intensity. In the power saving mode b) shown in FIG. 12b 14b the light emitting device 103 is dimmed by means of a method according to the invention such that the light sources 21, 22 arranged closest to a point P on the first light input surface 41, i.e. as shown the light sources arranged centrally in the array, are switched off. The point P is located where the distance perpendicular to each of the light exit surfaces 42, 43, 44 and 46 is the largest possible, the distance perpendicular to each of the light exit surfaces 42, 43, 44 and 46 being given equal weight. That is in this embodiment the point P is located at the center of the light input surface 41 of the first light guide 4. Hence, the thickness of the arrows, which generally illustrate the emitted light 141, 142, 143, 144 with the second spectral distribution, illustrates the intensity of the emitted light.

In the following embodiments of a method according to the invention will be described.

Generally, a method for dimming a light emitting device according to the invention comprises the steps of providing a light emitting device according to the invention and comprising at least two light sources adapted for, in operation, emitting light, a first light guide comprising a first light input surface and a first light exit surface, the first light guide being adapted for receiving the light from the at least two light sources at the first light input surface, converting at least a part of the light from the at least two light sources to light with a second spectral distribution, guiding light with the second spectral distribution to the first light exit surface and coupling the light with the second spectral distribution out of the first light exit surface, the at least two light sources being arranged at mutually different distances from the first light exit surface of the first light guide, and dimming the light source of the at least two light sources in order of distance from the first light exit surface of the first light guide. In other words the light sources are dimmed, preferably for example one by one, starting with that of the at least two light sources being arranged at the largest distance from the first light exit surface of the first light guide.

Alternatively, the light sources are dimmed more than one at the same time, e.g. two light sources are dimmed simultaneously and two other light sources are also dimmed simultaneously but at another time than the first two light sources, starting with the light sources which are arranged at the largest distance from the first light exit surface of the first light guide.

In all embodiments of the method according to the invention the light sources are single light sources such as single LEDs. Suitable types of light sources and particularly LEDs are described above.

In some embodiments the method may comprise the step of providing a control device 90. Then the step of dimming is performed by means of the control device 90 (cf. FIG. 911a-11b), which is connected to the light sources by means of a suitable connection 91. The control device 90 may be any suitable control device known in the art. The control device 90 is capable of controlling the light sources 21, 22, 23, 24 individually. The connection 91 may be a wired connection or a wireless connection. The control device 90 may be manually, remotely or automatically actuated.

In an embodiment the step of dimming comprises switching off at least one of the at least two light sources, whereby a further degree of dimming is made possible.

In an embodiment the step of dimming comprises the step of sequentially applying at least two continuous direct voltage (DC) currents having mutually different magnitudes to at least one of the at least two light sources. In an embodiment the step of dimming is carried out using pulse width modulation of the current supplied to at least one of the at least two light sources.

By way of any one of the two above-mentioned embodiments a method for dimming a light emitting device is provided with which a wide variety of degrees of dimming are made available in a particularly simple and straight forward manner.

In projection applications where a Digital Light Processing (DLP)/Digital Micromirror Device (DMD) is used, colors (e.g. RGB) are displayed sequentially at a sufficiently high rate such that an observer sees a composite "full color" image. This means that e.g. the green light source is pulsed. Therefore, in some embodiments non-continuous (DC) currents are used. Pulse width modulation may also be used in color controllable light sources. Continuous currents are in general used for static LED light sources.

In an embodiment the light emitting device comprises a plurality of light sources, and the step of dimming comprises dimming groups of at least two light sources of the plurality of light sources one by one starting with the group of at least two light sources arranged at the largest distance from the first light exit surface of the first light guide. Thereby a method for dimming a light emitting device is provided with which a yet further variety of degrees of dimming are made available in that the light sources may be dimmed groupwise, e.g. two by two or four by four.

Turning now to FIGS. 13a15a-13 15d a first embodiment of the step of dimming of a method according to the invention is illustrated, in which the dimming is performed by switching off the at least two light sources one by one starting with the one being arranged at the largest distance, i.e. the farthest away, from the first light exit surface of the first light guide.

Figure 13B:
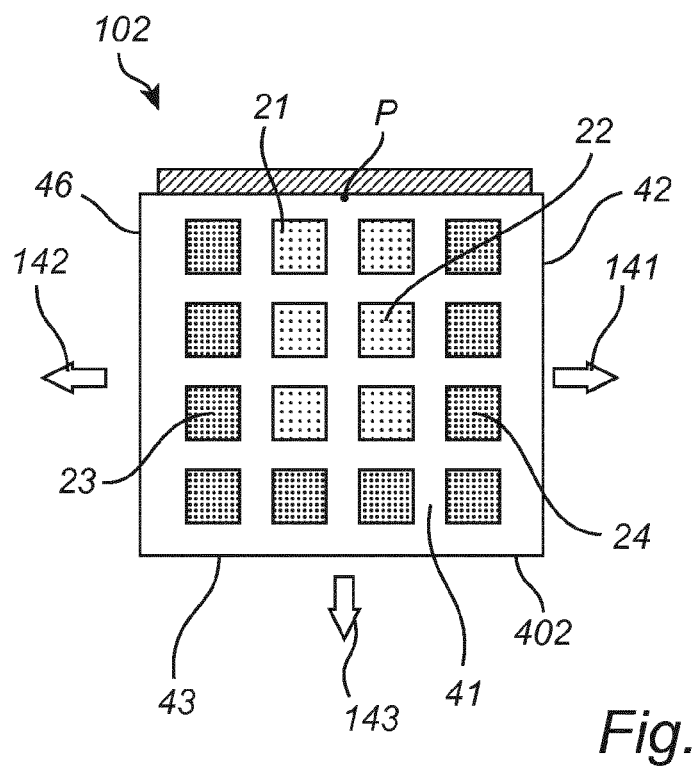

Starting from FIG. 13a 15a all shown four light sources emit at maximum intensity and the light emitting device is in the full power mode. In FIGS. 135b, 13c 15c and 13d15d, respectively, three different power saving modes are shown. In FIG. 13b 15b a first degree of dimming is obtained by switching off the light source 21 being the farthest away from the first light exit surface of the first light guide. In FIGS. 13c 15c and 13d 15d further degrees of dimming are obtained by additionally switching off the light source 22 being the second farthest away from the first light exit surface of the first light guide, and subsequently additionally switching off the light source 23 being the third farthest away from the first light exit surface of the first light guide, and only the light source 24 which is closest to the first light exit surface of the first light guide is in this dimming mode switched on, as depicted in FIG. 135*d*.

FIGS. 14*a*16*a*-14*d* 16*d* illustrate a second embodiment of the step of dimming of a method according to the invention, in which the dimming is performed by reducing, or in other words dimming but not switching off, the emitting intensity of the at least two light sources one by one starting with the one being arranged at the largest distance, i.e. the farthest away, from the first light exit surface of the first light guide.

Figure 14B:
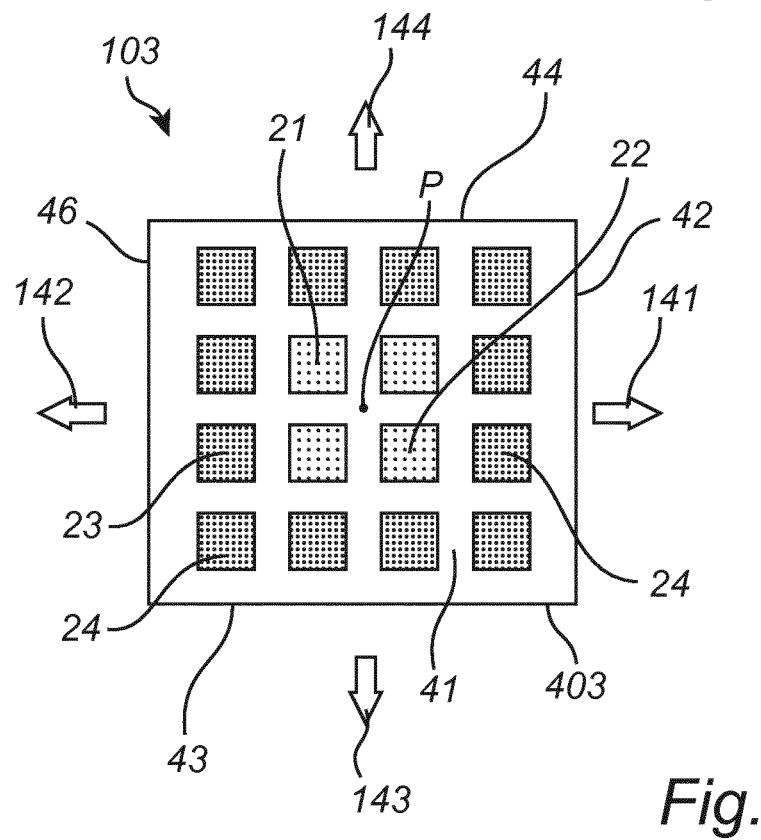

Starting from FIG. 14*a*16*a*, all four light sources shown emit at maximum intensity. The light emitting device is in the full power mode. In FIG. 14*b*16*b*, 14*c* 16*c* and 14*d*16*d*, respectively, three different power saving modes are shown. In FIG. 14*b* 16*b* a first degree of dimming is obtained by dimming the light source 21 which is the farthest away from the first light exit surface of the first light guide such that it emits light at a reduced intensity. In FIGS. 14*c* 16*c* and 14*d* 16*d* further degrees of dimming are obtained, i.e. a further reduced light intensity level produced by the light emitting device, by additionally dimming first the light source 22 being the second farthest away from the first light exit surface of the first light guide, and subsequently additionally the light source 23 being the third farthest away from the first light exit surface of the first light guide, to emit at the same reduced intensity as the light source 21.

In this way it is possible to obtain a wide variety of degrees of freedom of dimming in that the light sources may be dimmed to any desired intensity in the interval from zero to the maximum possible intensity at which the light source may emit. Also, a considerably larger efficiency is obtained as it becomes possible to dim the light emitting device to more precisely fulfill given requirements and circumstances. Furthermore, by first dimming the light source which is farthest away from the light exit surface and which contributes the most to absorption losses and energy inefficiency, a more energy efficient light emitting device is obtained.

FIGS. 15*a*17*a*-15*c* 17*c* illustrate a third embodiment of the step of dimming of a method according to the invention in which the dimming is performed by reducing, or in other words dimming but not switching off, the emitting intensity of the at least two light sources two by two, i.e. in pairs, starting with the two light sources being arranged at the largest distance, i.e. the farthest away, from the first light exit surface of the first light guide.

Starting from FIG. 15*a*17*a*, all four light sources shown emit at maximum intensity. The light emitting device is in the full power mode. In FIGS. 15*b* 17*b* and 15*c*17*c*, respectively, two different power saving modes are shown. In FIG. 15*b* 17*b* a first degree of dimming is obtained by dimming the two light sources 21 and 22 being the farthest away from the first light exit surface of the first light guide to emit at a reduced intensity. In FIG. 15*c* 17*c* a further degree of dimming is obtained, i.e. a further reduction of the light intensity emitted by the light emitting device, by switching off the two light sources 21 and 22 which are the farthest away from the first light exit surface of the first light guide and simultaneously dimming the two light sources 23 and 24 which are the second farthest away from the first light exit surface of the first light guide such that these emit light at a reduced intensity.

FIGS. 16*a*18*a*-16*d* 18*d* illustrate a fourth embodiment of the step of dimming of a method according to the invention in which the dimming is performed by gradually reducing the emitting intensity, or in other words by gradually dimming but not switching off, the at least two light sources one by one starting with the one being arranged at the largest distance, i.e. the farthest away, from the first light exit surface of the first light guide.

Starting from FIG. 6*a*18*a*, all four light sources shown emit at maximum intensity. The light emitting device is in the full power mode. In FIGS. 16*b*18*b*, 168*c* and 16*d*18*d*, respectively, three different power saving modes are shown. In FIG. 16*b* 18*b* a first degree of dimming is obtained by dimming the light source 21 which is the farthest away from the first light exit surface of the first light guide such that it emits light at a reduced, first intensity. In FIG. 16*c* 18*c* a further degree of dimming is obtained by further dimming the light source 21 such that it emits light at a further reduced, second intensity in which the second intensity is lower than the first intensity, and by also dimming the light source 22 which is the second farthest away from the first light exit surface of the first light guide such that the light source 22 emits light at a reduced, third intensity. In FIG. 16*d* 18*d* a further degree of dimming is obtained by further dimming both the light sources 21 and 22 as well as by dimming the light source 23 being the third farthest away from the first light exit surface of the first light guide.

Thereby the four light sources 21, 22, 23, 24 emit at mutually different intensities below the maximum possible intensity in such a way that the intensity with which a given light source emits is lower the farther away from the first light exit surface the light source is arranged. In other words the intensity with which the light source 21 emits is the lowest, the intensity with which the light source 22 emits is somewhat larger than that of the light source 21, the intensity with which the light source 23 emits is somewhat larger than that of the light source 22 and the intensity with which the light source 24 emits is somewhat larger than that of the light source 23. It is feasible that the intensity with which two or more neighboring light sources, e.g. the light sources 22 and 23, are emitting may be comparable in size.

Dimming may be obtained by reducing the intensity with which a light source emits light and/or by switching off the light source. In practice, dimming is obtained by means of the control device. To this end the control device is typically adapted for altering, particularly reducing, the amount of power, i.e. the current, delivered to the individual light sources.

Figure 19:
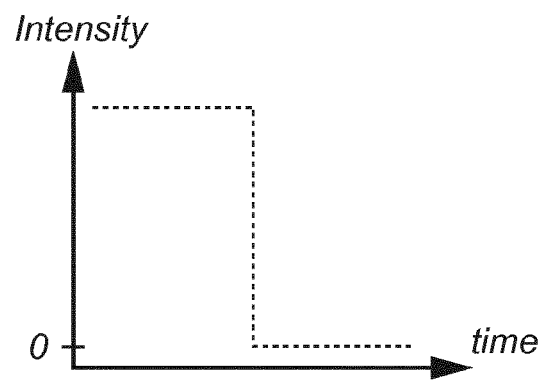
FIGS. 19 through 21 show three graphs illustrating the intensity of the light emitted by a light emitting device according to the invention as a function of time when dimming the light sources of the light emitting device according to three different embodiments of a method according to the invention.
Figure 21:
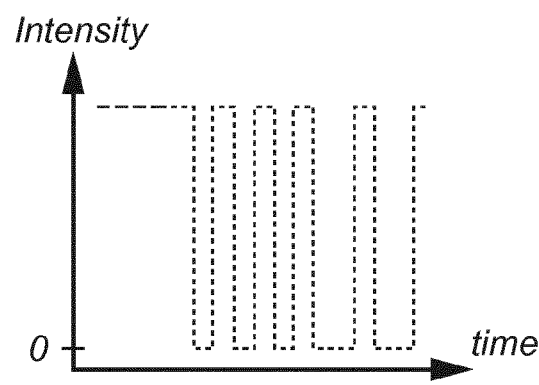

FIG. 1719-19 21 show graphs of intensity of the light emitted by a light source as a function of time, the graphs illustrating the impact of the intensity with which a light source emits of different embodiments of alterations of the amount of power, i.e. the current, delivered to the light source, made in the step of dimming.

In a first embodiment the current delivered to the light source is simply switched off at a particular point of time, at which the graph shown in FIG. 17 19 shows the intensity falling to zero.

Figure 20:
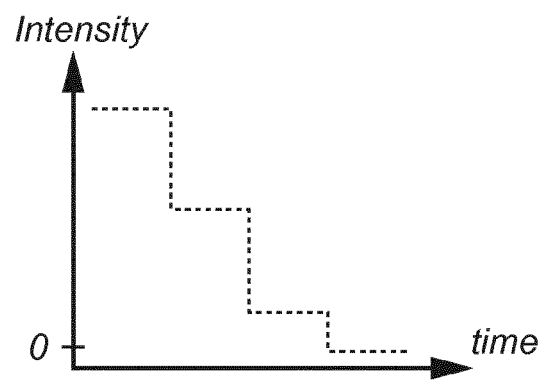

In a second embodiment the current delivered to the light source is delivered by applying different constant current levels, particularly DC current levels, the current being lowered successively at particular points of time, at which the graph shown in FIG. 18 20 shows the intensity falling to successively lower levels, ending at zero.

In a third embodiment the voltage, or current, delivered to the light source is altered by using pulse width modulation, which the graph shown in FIG. 19 21 illustrates by time periods with reduced intensity, wherein the length of the time periods determines the desired degree of dimming.

LEDs can be dimmed in two ways: analog and pulse-width modulation (PWM) dimming. Analog dimming changes LED light output by simply adjusting the DC current in the string, while PWM dimming achieves the same effect by varying the duty cycle of a constant current in the string to effectively change the average current in the string. If, over a short duration of time, the LED is turned on for 50% and off for 50% of the time, the LED will appear half as bright since the total light output over the time duration is only half as much as for 100% on-time. In this connection, the duty-cycle refers to the total amount of time a pulse is 'on' over the duration of the cycle, so at 50% brightness the duty-cycle of the LED is 50%. The intensity of the LED is increased by increasing the duty cycle.

Light emitting devices adapted for performing a method according to the invention may be used in a wide variety of appliances such as, but not limited to, projectors, automotive lighting systems, lamps and luminaires.

The person skilled in the art realizes that the present invention by no means is limited to the preferred embodiments described above. On the contrary, many modifications and variations are possible within the scope of the appended claims. For instance, a light emitting device according to the invention may comprise a combination of the different types of light guides described herein and/or a combination of different types of light sources. Likewise, a method according to the invention may comprise a combination of the different possible steps for obtaining dimming of the light emitting device.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A light emitting device, comprising:
at least two light sources adapted for, in operation, emitting light with a first spectral distribution, a first light guide comprising a first light input surface, which is arranged parallel to the main waveguiding direction of the first light guide, and a first light exit surface extending in an angle different from zero in relation to the first light input surface, the first light guide being adapted for receiving the light with the first spectral distribution at the first light input surface, converting at least a part of the light with the first spectral distribution to light with a second spectral distribution, guiding the light with the second spectral distribution to the first light exit surface and coupling the light with the second spectral distribution out of the first light exit surface, the at least two light sources being arranged at mutually different distances from the first light exit surface of the first light guide, and
a control device adapted for dimming the light emitting device starting with the light source of the at least two light sources which is arranged at a largest distance from the first light exit surface of the first light guide.

2. The light emitting device according to claim 1, wherein the control device is adapted for dimming the light sources one by one.

3. The light emitting device according to claim 1, wherein the light emitting device comprises a plurality of light sources, and wherein the control device further is adapted for dimming at least two light sources of the plurality of light sources such as to emit light at different intensity levels, the intensity levels decreasing with increasing distance between each light source and the first light exit surface of the first light guide.

4. The light emitting device according to claim 1, wherein the light emitting device comprises a plurality of light sources, and wherein the control device further is adapted for dimming groups of at least two light sources of the plurality of light sources starting with the group of at least two light sources arranged at the largest distance from the first light exit surface of the first light guide.

5. The light emitting device according to claim 4, wherein the control device is adapted for dimming the groups of at least two light sources one by one.

6. The light emitting device according to claim 4, wherein the control device further is adapted for switching off groups of at least two light sources of the plurality of light sources one by one starting with the group of at least two light sources arranged at the largest distance from the first light exit surface of the first light guide.

7. The light emitting device according to claim 1, wherein the first light guide of the light emitting device comprises at least one further light exit surface, and wherein the control device further is adapted for dimming the at least two light sources one by one starting with that of the at least two light sources being arranged closest to a point (P) on the first light input surface, which point (P) is located where the distance perpendicular to each of the light exit surfaces is the largest possible, the distance perpendicular to each of the light exit surfaces being given equal weight.

8. The light emitting device according to claim 1, wherein the control device further is adapted for any one or more of switching off at least one of the at least two light sources, sequentially applying at least two continuous direct voltage (DC) currents having mutually different magnitudes to at least one of the at least two light source and using pulse width modulation of a current supplied to at least one of the at least two light sources.

9. A lamp, luminaire or projector comprising a light emitting device according to claim 1.

10. A method for dimming a light emitting device, the method comprising the steps of:
providing a light emitting device comprising at least two light sources adapted for, in operation, emitting light with a first spectral distribution, a first light guide comprising a first light input surface, which is arranged parallel to the main waveguiding direction of the first light guide, and a first light exit surface extending in an angle different from zero in relation to the first light input surface, the first light guide being adapted for receiving the light with the first spectral distribution at the first light input surface, converting at least a part of the light with the first spectral distribution to light with a second spectral distribution, guiding the light with the second spectral distribution to the first light exit surface and coupling the light with the second spectral distribution out of the first light exit surface, the at least two light sources being arranged at mutually different distances from the first light exit surface of the first light guide, and
dimming the light source of the at least two light sources which is arranged at the largest distance from the first light exit surface of the first light guide.

11. The method according to claim 10, wherein the step of dimming comprises dimming the at least two light sources one by one.

12. The method according to claim 10, and comprising the further steps of:

providing a control device adapted for performing the step of dimming the at least two light sources, and performing the step of dimming the at least two light sources by means of the control device.

13. The method according to claim 10, wherein the light emitting device comprises a plurality of light sources, and wherein the step of dimming comprises dimming at least two light sources of the plurality of light sources such as to emit light at different intensity levels, the intensity levels decreasing with increasing distance between each light source and the first light exit surface of the first light guide.

14. The method according to claim 10, wherein the light emitting device comprises a plurality of light sources, and wherein the step of dimming comprises dimming groups of at least two light sources of the plurality of light sources one by one starting with the group of at least two light sources arranged at the largest distance from the first light exit surface of the first light guide.

15. The method according to claim 10, wherein the first light guide of the light emitting device comprises at least one further light exit surface, and wherein the step of dimming comprises dimming the at least two light sources one by one starting with that of the at least two light sources being arranged closest to a point (P) on the first light input surface, which point (P) is located where the distance to each of the light exit surfaces is the largest possible, the distance perpendicular to each of the light exit surfaces being given equal weight.

* * * * *